(12) United States Patent
Poon et al.

(10) Patent No.: US 8,526,500 B2
(45) Date of Patent: *Sep. 3, 2013

(54) SYSTEM AND METHOD FOR GLOBAL INTER-FRAME MOTION DETECTION IN VIDEO SEQUENCES

(75) Inventors: Eunice Poon, Scarborough (CA); Mikhail Brusnitsyn, North York (CA)

(73) Assignee: Seiko Epson Corporation, Tokyo (JP)

( * ) Notice: Subject to any disclaimer, the term of this patent is extended or adjusted under 35 U.S.C. 154(b) by 1058 days.

This patent is subject to a terminal disclaimer.

(21) Appl. No.: 12/538,940

(22) Filed: Aug. 11, 2009

(65) Prior Publication Data

US 2011/0037895 A1  Feb. 17, 2011

(51) Int. Cl.
*H04N 7/12* (2006.01)
*H04N 7/50* (2006.01)

(52) U.S. Cl.
CPC ..................... *H04N 7/50* (2013.01)
USPC ............. 375/240.16; 348/700; 375/240.24

(58) Field of Classification Search
USPC .................................................. 375/240.16
See application file for complete search history.

(56) References Cited

U.S. PATENT DOCUMENTS

| | | | |
|---|---|---|---|
| 5,541,669 | A | 7/1996 | Yamaguchi et al. |
| 6,222,882 | B1 | 4/2001 | Lee et al. |
| 6,226,413 | B1 | 5/2001 | Jandel |
| 6,421,466 | B1 | 7/2002 | Lin |
| 6,535,244 | B1 | 3/2003 | Lee et al. |
| 7,020,201 | B2 | 3/2006 | Luo et al. |
| 7,224,731 | B2 | 5/2007 | Mehrotra |
| 7,420,626 | B1 | 9/2008 | Pillay et al. |

(Continued)

FOREIGN PATENT DOCUMENTS

| | | |
|---|---|---|
| GB | 2432473 | 5/2007 |
| JP | 09098423 | 4/1997 |
| JP | 2006157251 | 6/2006 |

OTHER PUBLICATIONS

Avoiding Unnecessary Frame Memory Access and Multi-Frame Motion Estimation Computation in 11.264/AVC, Wei-Cheng Lin and Chung-Ho Chen, Department of Electrical Engineering and Institute of Computer and Communication Engineering, National Cheng-Kung University, Taiwan, IEEE International Symposium on Circuits and Systems, May 18-21, 2008, (pp. 632-635).

Embedded Video Coding Using Invertible Motion Compensated 3-D Subband/Wavelet Filter Bank, Shih-Ta Hsiang and John W. Woods, Center for Next Generation Video and Electrical, Computer, and Systems Eigineering Department, Rensselaer Polytechnic Institute, Troy, NY, available online May 31, 2001(pp. 705-724).

(Continued)

*Primary Examiner* — Jay Patel
*Assistant Examiner* — Jessica Prince

(57) ABSTRACT

Methods and systems for detecting and compensating for motion depicted in a sequence of frames are disclosed. One example method includes converting video frames to monochrome. Conversion of an image to monochrome includes sampling luminance data of a portion of pixels in the image to identify the image as being of a particular image type, selecting a bit plane of the image based on the identified image type, and converting the image to a monochrome image using the selected bit plane. After conversion of video frames to monochrome, a pixel subset in a monochrome image corresponding to a first frame is compared to candidate matching pixel subsets within a search area of a monochrome image corresponding to a second, consecutive frame. The frames are processed to compensate for perceived motion blur based on the detected inter-frame motion.

15 Claims, 27 Drawing Sheets

(56) References Cited

U.S. PATENT DOCUMENTS

| | | |
|---|---|---|
| 7,551,673 B1 * | 6/2009 | Oh et al. .................. 375/240.16 |
| 7,649,549 B2 * | 1/2010 | Batur ......................... 348/208.6 |
| 8,160,148 B2 * | 4/2012 | Booth et al. ............. 375/240.16 |
| 2003/0202594 A1 * | 10/2003 | Lainema .................. 375/240.16 |
| 2004/0066849 A1 | 4/2004 | Van Der Schaar |
| 2004/0190619 A1 | 9/2004 | Lee et al. |
| 2007/0122131 A1 | 5/2007 | Hirai |
| 2008/0107186 A1 * | 5/2008 | Brusnitsyn et al. ...... 375/240.28 |

OTHER PUBLICATIONS

Sequential Motion Estimation Using Luminance and Chrominance Information for Distributed Video Coding of Wyner-Ziv Frames, A.B.B. Adikari, W.A.C. Fernando, H. Kodikara Arachchi and W.A.R.J. Weerakkody, Electronics Letters, Mar. 30, 2006, vol. 42, No. 7, (pp. 398-399).

* cited by examiner

SYSTEM AND METHOD FOR GLOBAL INTER-FRAME MOTION DETECTION IN VIDEO SEQUENCES

THE FIELD OF THE INVENTION

Embodiments of the invention generally relate to detecting and compensating for global inter-frame motion depicted in a sequence of digital video frames. More specifically, disclosed embodiments relate to methods, devices, and computer-readable media for detecting and compensating for global inter-frame motion in video frames.

BACKGROUND

Detecting motion in digital video can be used in context with a variety of image processing applications. For example, inter-frame motion detection can be used in connection with addressing blur that is perceived by the human eye when viewing the frames on a hold-type display, such as a liquid crystal display. However, detection of inter-frame motion is difficult to perform quickly and accurately. For example, detecting global inter-frame motion can be computationally expensive, cause processing delays, and require large amounts of memory. To address these problems video frames are sometimes compressed prior to detecting inter-frame motion. A color video frame or image may be compressed by using a bit plane of the image, which is a monochrome image. However, the selected bit plane used for inter-frame motion detection can vary depending on luminance levels in the image and the type of scene depicted in the image.

SUMMARY OF EXAMPLE EMBODIMENTS

In general, example embodiments relate to methods, devices, and computer-readable media for detecting and compensating for inter-frame motion in digital video frames.

In a first example embodiment, a method for converting an image to a monochrome image includes sampling luminance data of a portion of pixels in the image to identify the image as being of a particular image type. A bit plane of the image is then selected based on the identified image type, and the image is converted to a monochrome image using the selected bit plane.

In a second example embodiment, a method for estimating inter-frame motion depicted in a sequence of frames includes converting a first video frame in the sequence to a first monochrome image according to the image converting method of the first example embodiment, and converting a second video frame in the sequence to a second monochrome image using a bit plane of the second video frame that corresponds to the selected bit plane used for image conversion in the first video frame. Block matching is then performed using the first and second monochrome images to recover inter-frame motion.

In a third example embodiment, a method for converting an image to a monochrome image includes determining a frequency of bit changes in at least a portion of at least one bit plane of the image. Next, the determined bit change frequency is compared to a threshold to select a single bit plane of the image and the image is converted to monochrome using the selected bit plane. The at least one bit plane for which the frequency of bit changes is determined does not include the selected bit plane.

In a fourth example embodiment, one or more computer-readable media have computer-readable instructions thereon which, when executed, implement the method for inter-frame motion detection discussed above in connection with the second example embodiment.

In a fifth example embodiment, a method for estimating global inter-frame motion between two video frames in a digital video sequence includes first comparing luminance data of a reference pixel subset of a first one of the video frames to luminance data of candidate pixel subsets within a search area in a second one of the video frames to determine a preliminary matching pixel subset from the candidate pixel subsets. Next, an act of determining an actual matching pixel subset from the other video frame based on a location of the preliminary matching pixel subset relative to said search area is performed. A global inter-frame motion vector characterizing global inter-frame motion is then calculated based on a location of the actual matching pixel subset.

In a sixth example embodiment, an apparatus for estimating global inter-frame motion between two video frames in a digital video sequence includes a frame comparator, a match position estimator, and global inter-frame motion estimator. The frame comparator is configured to compare a reference pixel subset of a first one of the two video frames to candidate pixel subsets within a search area in a second one of the video frames to determine a preliminary matching pixel subset from the candidate pixel subsets. The match position estimator is configured to determine a location of the preliminary matching pixel subset relative to said search area and the frame comparator is further configured to determine an actual matching pixel subset from the second video frame based on a location determined by the match position estimator. The global inter-frame motion estimator is configured to calculate a global inter-frame motion vector based on a location of the actual matching pixel subset.

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

Additional features will be set forth in the description which follows, and in part will be obvious from the description, or may be learned by the practice of the teachings herein. Features of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

To further develop the above and other aspects of example embodiments of the invention, a more particular description of these examples will be rendered by reference to specific embodiments thereof which are disclosed in the appended drawings. It is appreciated that these drawings depict only example embodiments of the invention and are therefore not to be considered limiting of its scope. It is also appreciated that the drawings are diagrammatic and schematic representations of example embodiments of the invention, and are not limiting of the present invention. Example embodiments of the invention will be disclosed and explained with additional specificity and detail through the use of the accompanying drawings in which:

FIG. 6 is a diagram of a first video frame divided into a plurality of pixel blocks;

FIG. 14 is a diagram of a first video frame divided into a plurality of pixel blocks and a window surrounding the plurality of pixel blocks;

FIG. 15 is a diagram showing the window surrounding the plurality of pixel blocks of FIG. 14 overlying a single search area in the consecutive video frame;

FIGS. 16A-16C are diagrams of the consecutive video frame with all pixel blocks in the window of FIG. 14 being progressively positioned within the single search area during frame matching.

DETAILED DESCRIPTION

Figure 1:
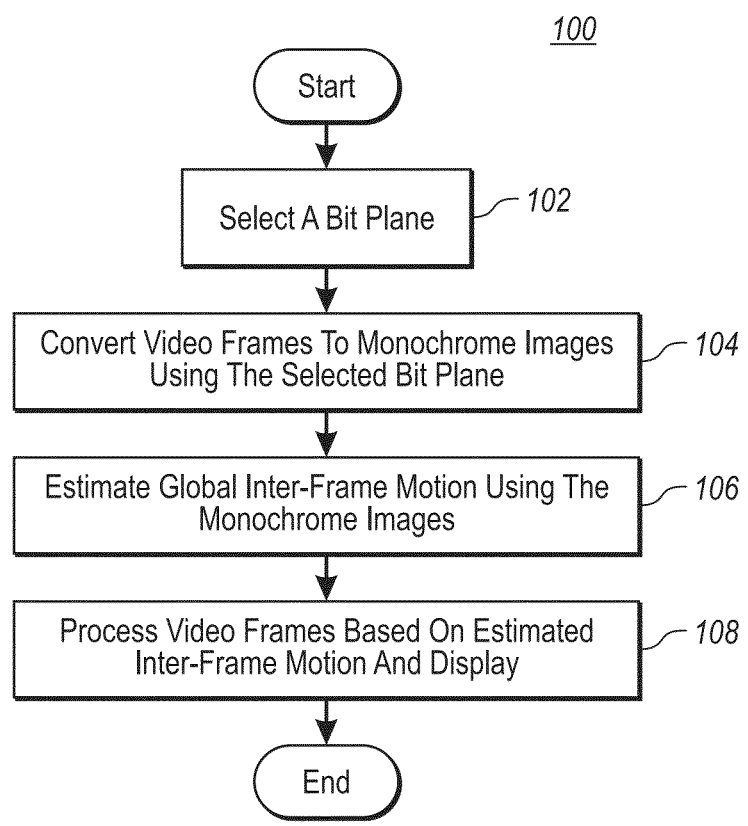
FIG. 1 discloses an example method for detecting and compensating for inter-frame motion.

In the following detailed description, reference is made to the accompanying drawings that show, by way of illustration, example embodiments of the invention. In the drawings, like numerals describe substantially similar components throughout the several views. These embodiments are described in sufficient detail to enable those skilled in the art to practice the invention. Other embodiments may be utilized and structural, logical and electrical changes may be made without departing from the scope of the present invention. Moreover, it is to be understood that the various embodiments of the invention, although different, are not necessarily mutually exclusive. For example, a particular feature, structure, or characteristic described in one embodiment may be included within other embodiments. The following detailed description is, therefore, not to be taken in a limiting sense, and the scope of the present invention is defined only by the appended claims, along with the full scope of equivalents to which such claims are entitled.

In general, example embodiments relate to methods, devices, and computer-readable media for detecting and compensating for inter-frame motion in a sequence of digital video frames. Example embodiments can be used in conjunction with a variety of image processing applications, including correction of perceived blur to produce digital video frames in which perceived blur is minimized. During inter-frame motion detection, a pixel subset of one of the video frames is compared to candidate pixel subsets within a search area in the other of the video frames to determine a preliminary matching pixel subset from the candidate pixel subsets. An actual matching pixel subset from the other of the video frames is determined based on the location of the preliminary matching pixel subset relative to the search area. A motion vector based on the pixel subset and the actual matching pixel subset is calculated thereby to estimate the inter-frame motion. The video frames are then processed based on the estimated inter-frame motion to compensate for the inter-frame motion.

With reference now to FIG. 1, an example method 100 for detecting and compensating for global inter-frame motion is disclosed. To detect and compensate for global inter-frame motion, a bit plane is selected (stage 102) and, for each pair of consecutive video frames in a video frame sequence, the video frames are converted to one bit-per-pixel (i.e., monochrome or bitonal) images using the selected bit plane (stage 104). Global inter-frame motion is then estimated for each pair of consecutive video frames using the monochrome images (stage 106) and the video frames are processed to compensate for the inter-frame motion and are displayed (stage 108). Processing of the video frames may include video frame rate interpolation and/or video motion quality enhancement.

Example method 100 and variations thereof disclosed herein can be implemented using computer-readable media for carrying or having computer-executable instructions or data structures stored thereon. Such computer-readable media can be any available media that can be accessed by a processor of a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store program code in the form of computer-executable instructions or data structures and which can be accessed by a processor of a general purpose or special purpose computer. Combinations of the above should also be included within the scope of computer-readable media.

Computer-executable instructions comprise, for example, instructions and data which cause a processor of a general purpose computer or a special purpose computer to perform a certain function or group of functions. Although the subject matter is described herein in language specific to methodological acts, it is to be understood that the subject matter defined in the appended claims is not necessarily limited to the specific acts described herein. Rather, the specific acts described herein are disclosed as example forms of implementing the claims.

Examples of special purpose computers include image processing devices such as digital camcorders, digital video displays, or portable movie players, or some combination thereof, or a digital camera/camcorder combination. An image processing device may include an inter-frame motion detection capability, for example, to detect inter-frame motion in a sequence of video frames. For example, a video display and/or capture device (i.e., a video device), such as a liquid crystal display, with this inter-frame motion detection capability may include one or more computer-readable media that implement example method 100. Alternatively, a computer connected to the video device may include one or more computer-readable media that implement example method 100.

Figure 2:
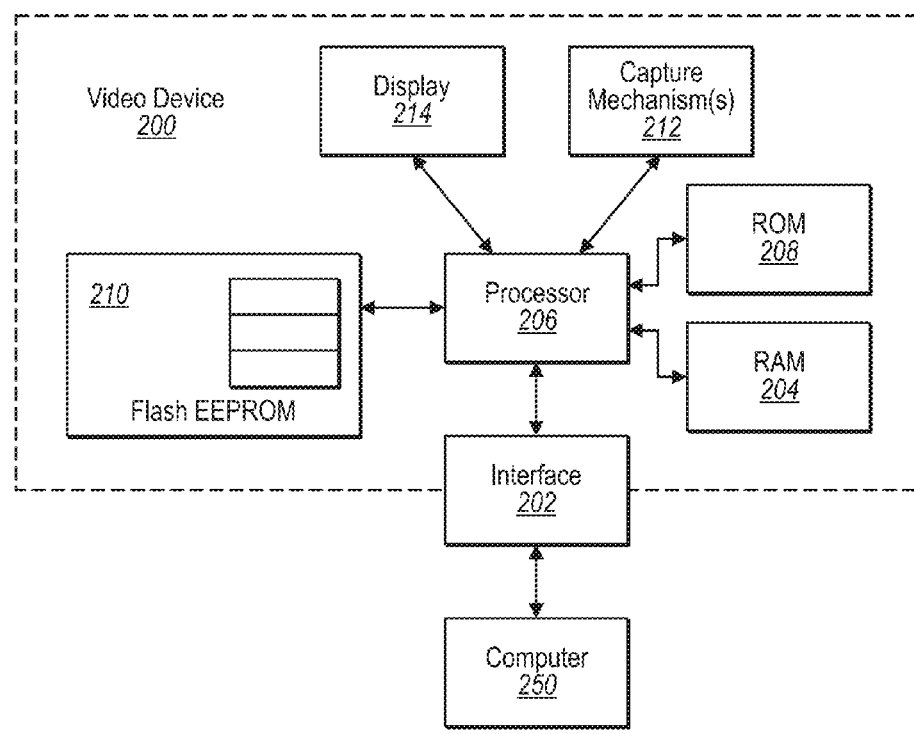
FIG. 2 is a schematic representation of an example video device.

A schematic representation of an example video device 200 is disclosed in FIG. 2. Example video device 200 exchanges data with a host computer 250 by way of an intervening interface 202. Application programs and a video device driver may also be stored for access on host computer 250. When a video retrieve command is received from the application program, for example, the video device driver controls conversion of the command data to a format suitable for video device 200 and sends the converted command data to video device 200. The driver also receives and interprets various signals and data from video device 200, and provides necessary information to the user by way of host computer 250.

When data, such as digital video data, is sent by host computer 250, interface 202 receives the data and stores it in a receive buffer forming part of a RAM 204. RAM 204 can be divided into a number of sections, for example through addressing, and allocated as different buffers, such as a receive buffer or a send buffer. Data, such as digital video data, can also be obtained by video device 200 from an optionally present capture mechanism(s) 212, a flash EEPROM 210, or a ROM 208. For example, capture mechanism(s) 212, if present, can generate a sequence of digital video frames. This sequence of frames can then be stored in the receive buffer or the send buffer of RAM 204.

A processor 206 uses computer-executable instructions stored on ROM 208 or on flash EEPROM 210, for example, to perform a certain function or group of functions, such as method 100 for example. Where the data in the receive buffer of RAM 204 is a sequence of digital video frames, for example, processor 206 can implement the methodological acts of method 100 on the sequence of frames to detect motion in various motion sections of the frames. Alternatively, a processor on host computer 250 can implement the methodological acts of method 100. Further processing in a video processing pipeline may then be performed on the sequence of frames before the video is displayed by video device 200 on a display 214, such as an LCD panel for example, or transferred to host computer 250, for example.

Figure 3:
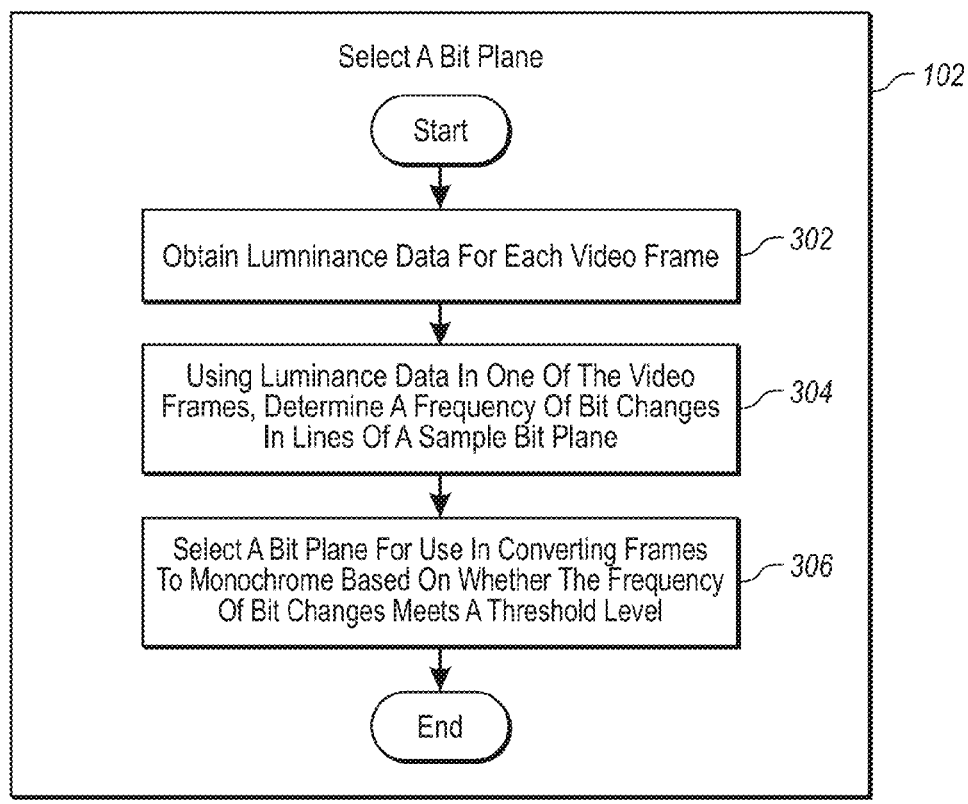
FIG. 3 discloses an example method for converting video frames to monochrome by selecting a bit plane.

FIG. 3 is a flowchart showing the steps performed to select a bit plane at stage 102. Initially, the luminance (Y) channel for the pixels in each of the video frames is obtained (stage 302). Using luminance data in one of the frames, a frequency of luminance bit changes in lines of a sample bit plane is determined (stage 304). Based on the frequency of bit changes, a bit plane of the video frames may be selected for use in converting the frames to monochrome images (stage 306). For example, if the frequency of bit changes meets a threshold level a first bit plane may be selected as the bit plane, otherwise a second bit plane may be selected as the bit plane.

The luminance of a pixel may be a value between 0 and 255 represented by a string of eight bits. Thus, the luminance data of a video frame may be expressed as a combination of eight bit planes, numbered from zero (least significant bit) to seven (most significant bit), corresponding to each of the eight bits used to represent a pixel's luminance value. The third bit plane corresponding to the third least significant bit, i.e., bit plane two, may be selected as the sample bit plane for purposes of selecting the bit plane used for monochrome conversion.

A sample region or regions in the sample bit plane, including, e.g., one or more sample lines, may be analyzed to classify the image as being of a particular image type. For example, based on an analysis of luminance changes in one or more sample lines of the sample bit plane, the corresponding video frame may be classified as either a natural image or a non-natural image. The second bit plane typically contains noise or noise-like luminance data for natural images and structural luminance data for non-natural images, such as computer-generated images containing text and/or graphics.

A frequency of bit changes F in a sample bit plane may be estimated as follows:

$$F = \frac{1}{K \cdot (W-1)} \sum_{k=1}^{K} \sum_{x=1}^{W-1} [L_k(x) \oplus L_k(x+1)]$$

where $\oplus$ denotes an XOR logic function, W denotes the width of the source image from which the sample bit plane is derived, K denotes a number of sample lines in the sample bit plane, and $L_k(x)$ denotes bit x in line k of the K sample lines. The bit change frequency formula above yields an average number of bit changes in K sample lines of the sample bit plane by comparing bits that correspond to neighboring pixels in the source image. The K sample lines may be one or more rows and/or columns of the sample bit plane. In one embodiment the sample region is limited to three rows or columns to reduce computational delay without unduly degrading accuracy of the bit change frequency estimate.

The bit change frequency estimate is compared to a frequency threshold to determine whether the source image depicts a natural scene or a non-natural (e.g., computer generated) scene. If the scene is determined to be of a natural type then bit plane six, corresponding to the sixth least significant bit, is selected as the bit plane for converting the source image to monochrome. Otherwise, the source image is classified as depicting a non-natural scene and the bit plane used for monochrome conversion is bit plane seven, corresponding to the seventh least significant bit. The frequency threshold in one embodiment is set to 0.15.

Thus a single bit plane may be used to represent a color frame for purposes of detecting inter-frame motion, thereby reducing a number of calculations performed. The bit plane is a monochrome image that may be stored as a byte image in which every eight pixels are packed into a one byte unit.

Figure 4:
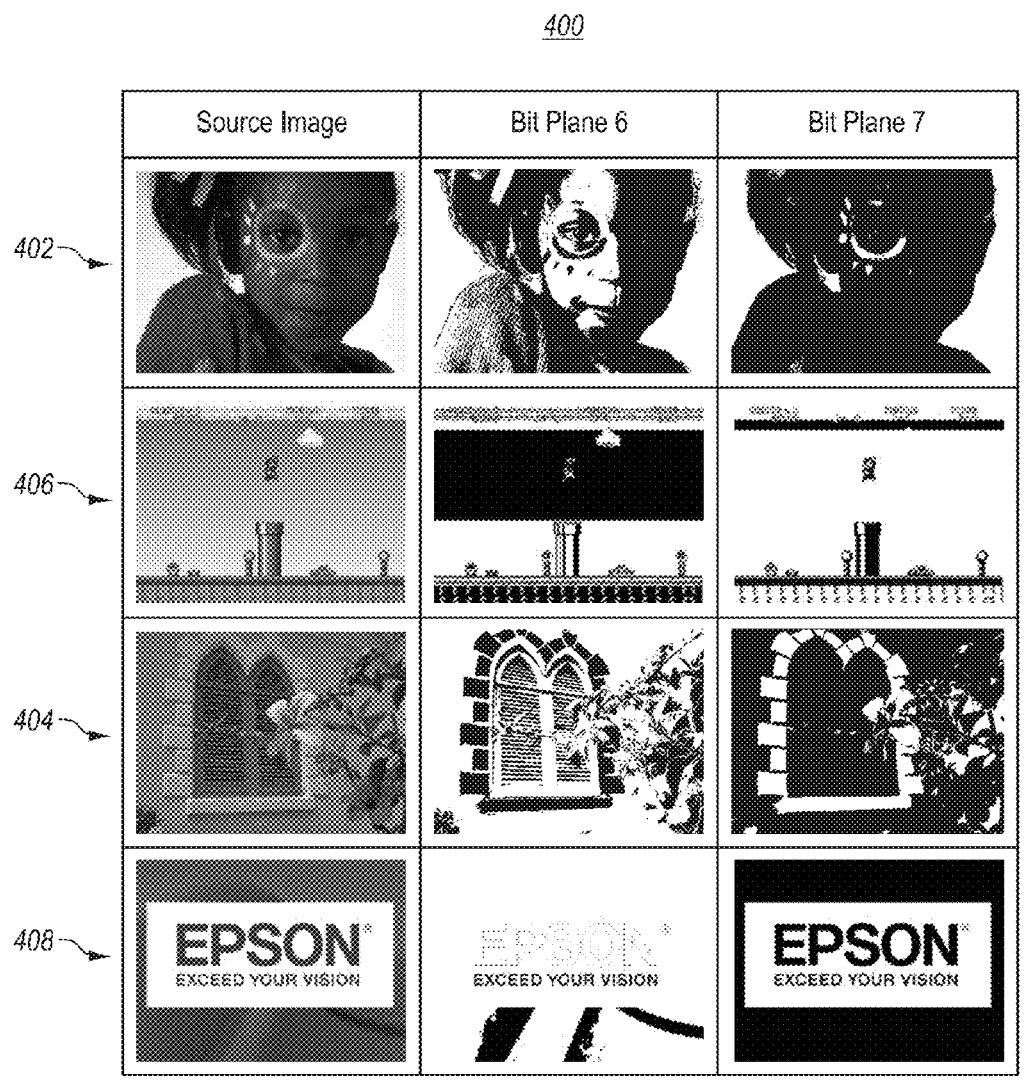
FIG. 4 discloses a table of example source images and corresponding bit planes.

FIG. 4 discloses a table 400 of sample source images and their corresponding sixth and seventh bit planes. A first row 402 and a third row 404 in the table each correspond to natural images. A second row 406 and a fourth row 408 each correspond to non-natural images. Table 400 demonstrates that a higher level of information is generally found in the sixth bit plane for natural images, whereas for non-natural images the seventh bit plane generally contains more information. By selecting the bit plane that is likely to contain more image information, a higher degree of image information is likely to be preserved when converting a sequence of frames to monochrome.

The source image used for bit plane selection may be a first frame in a segment or sequence of frames. New frames may be analyzed at regular intervals to determine whether to a different bit plane should be selected. Alternatively, the selection of a bit plane may be performed anew whenever a substantial difference is detected between consecutive frames and/or when an estimation of inter-frame motion becomes too unreliable.

Figure 5:
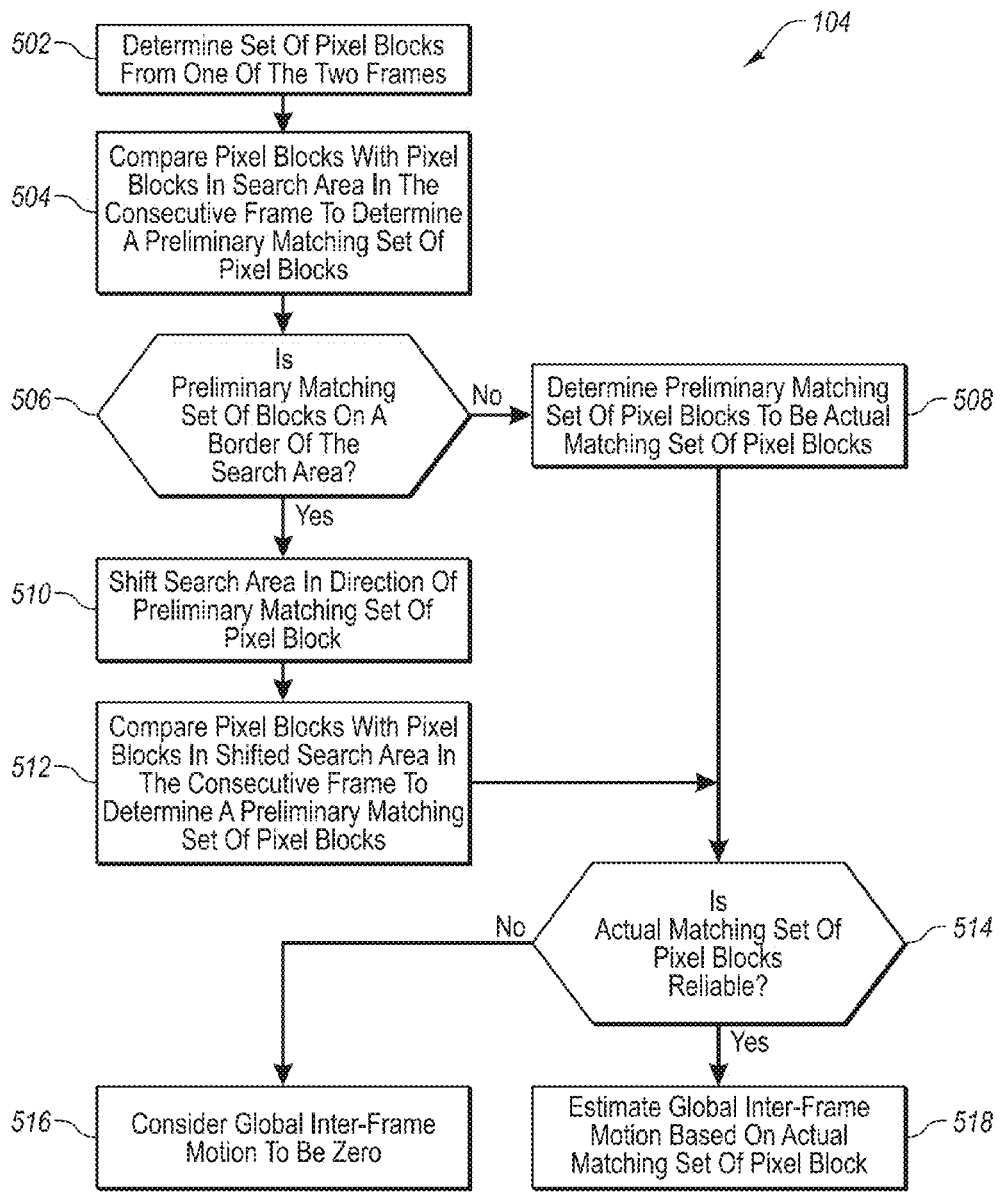
FIG. 5 is a flowchart showing the steps for performing frame matching using the monochrome video frames and an adaptable search area to estimate global inter-frame motion.

Referring again to FIG. 1, after the video frames are converted to monochrome at stage 104, global inter-frame motion may be estimated for a consecutive pair of video frames at stage 106 using the monochrome images corresponding to the pair of frames. FIG. 5 is a flowchart showing stages performed during estimation of global inter-frame motion at stage 106. Initially, a reference pixel subset comprising a set of reference pixel blocks that are generally evenly distributed across the first video frame is selected (stage 502). Each reference pixel block in the reference set comprises n×n (e.g., 8×8 or 16×16) pixels.

Figure 6:
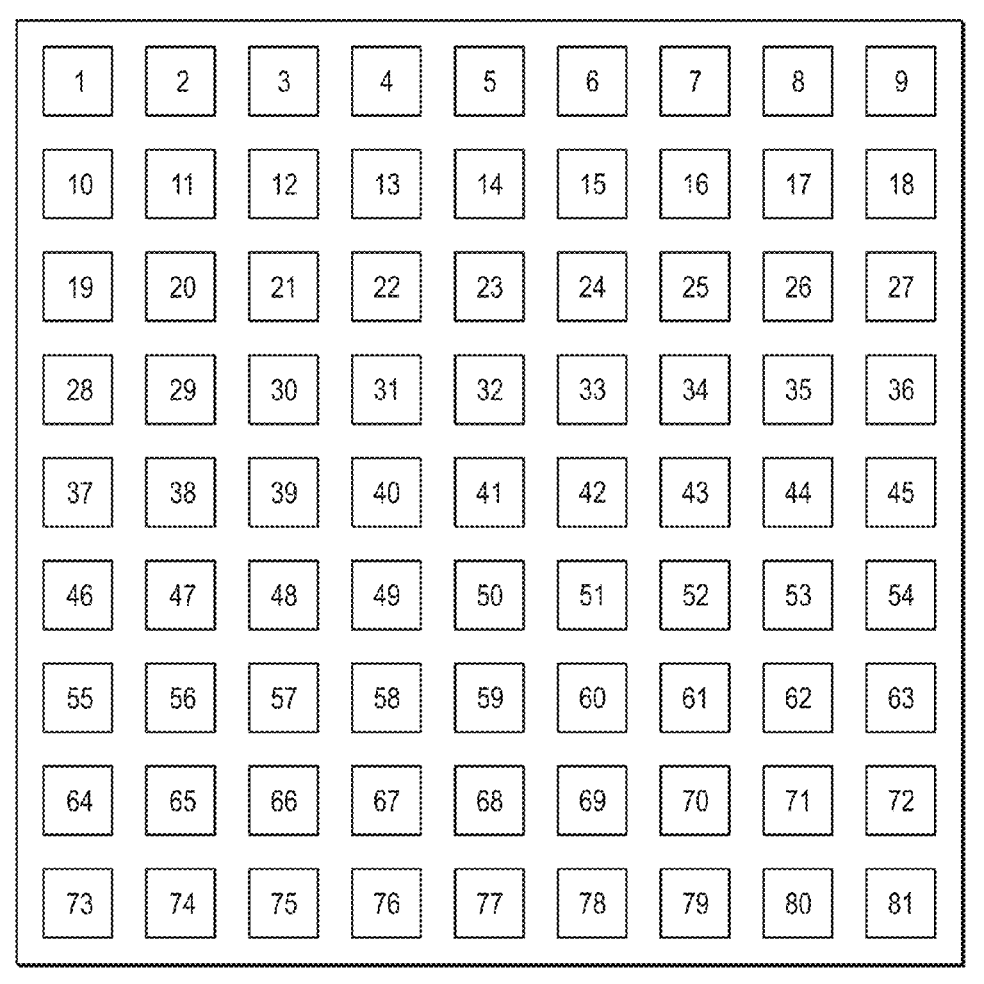

FIG. 6 shows the first video frame having a plurality of spaced apart, discrete reference pixel blocks therein. The reference pixel blocks are labeled as 1 to 81.

A search area for each of the reference pixel blocks in the first video frame is then defined in the second one of the consecutive pair of video frames. Each search area includes the pixels corresponding to those in its associated reference pixel block as well as a surrounding band of N pixels, where N is a small number. In one embodiment, N is equal to eight such that the band is eight pixels thick. In particular, each search area is both sixteen pixels wider and sixteen pixels taller (corresponding to a range of −8 to +8 in both the horizontal and vertical directions) than its associated pixel block.

Figure 7:
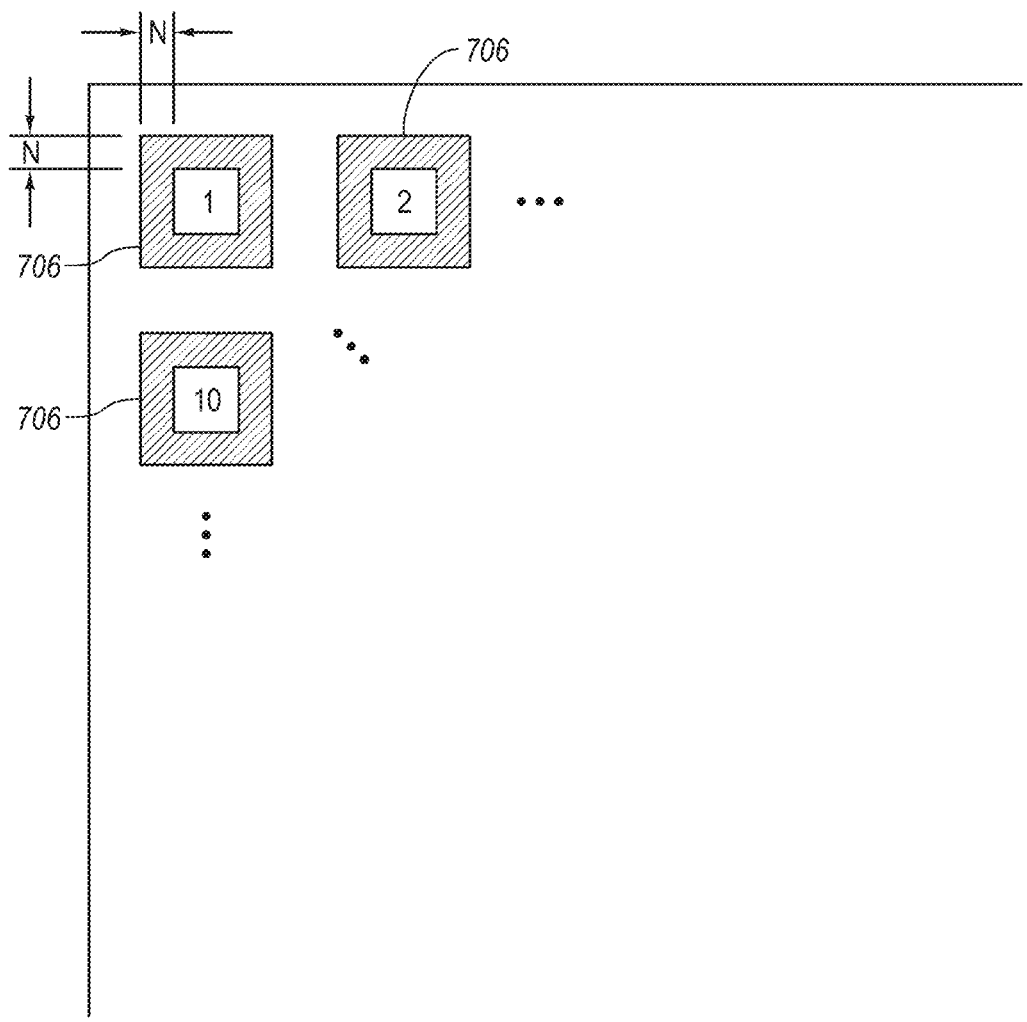
FIG. 7 is a diagram of a consecutive video frame showing three of the pixel blocks of FIG. 5 overlying respective search areas.

FIG. 7 shows the consecutive video frame with reference pixel blocks 1, 2 and 10 from the first video frame overlaying their respective search areas 706. Although not shown, search areas 706 for reference pixel blocks 3 to 9 and 11 to 81 are defined in a similar manner. In aggregate, individual search areas 706 form an overall search area for the purpose of frame and region matching as will be described below.

A 17×17 difference accumulator array is then defined. The dimensions of the difference accumulator array corresponds to the number of different positions available for each reference pixel block within its associated search area 706 during panning of the reference pixel block over the entire search area.

Figure 8A:
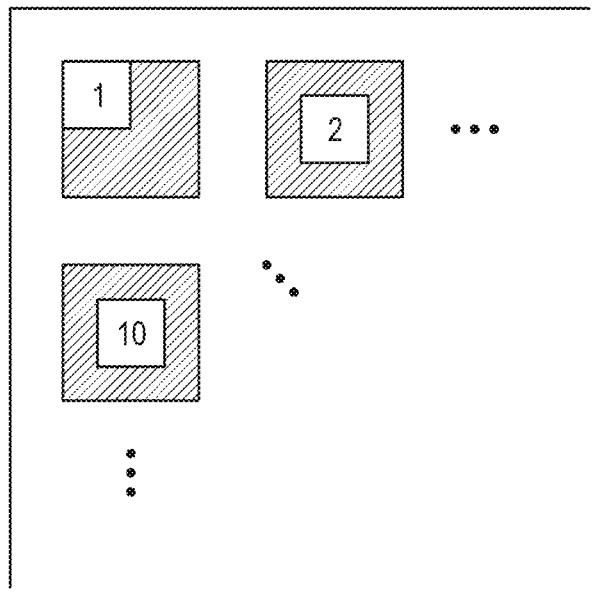
FIGS. 8A-8F are diagrams of a portion of the consecutive video frame of FIG. 7 with a first pixel block from the first video frame being progressively positioned within its respective search area during frame matching.

The reference pixel blocks in the first video frame are then compared with corresponding pixel blocks within their associated search areas 706 in the consecutive video frame in order to determine a preliminary matching set of pixel blocks (stage 504). During this process, reference pixel block 1 defined for the first video frame is placed at the top left corner of its associated search area 706 in the consecutive video frame (corresponding to the (−8, −8) position in its associated search area 706), as shown in FIG. 8A. The pixels of reference pixel block 1 are then compared with the corresponding pixels in the associated search area 706 and absolute pixel differences are calculated. The calculated absolute pixel differences for reference pixel block 1 are then accumulated and stored at position (1, 1) in the difference accumulator array.

Figure 8B:
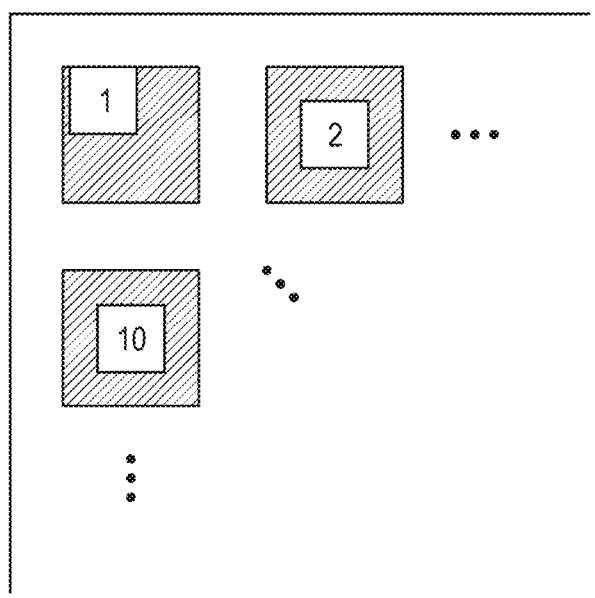
Figure 8C:
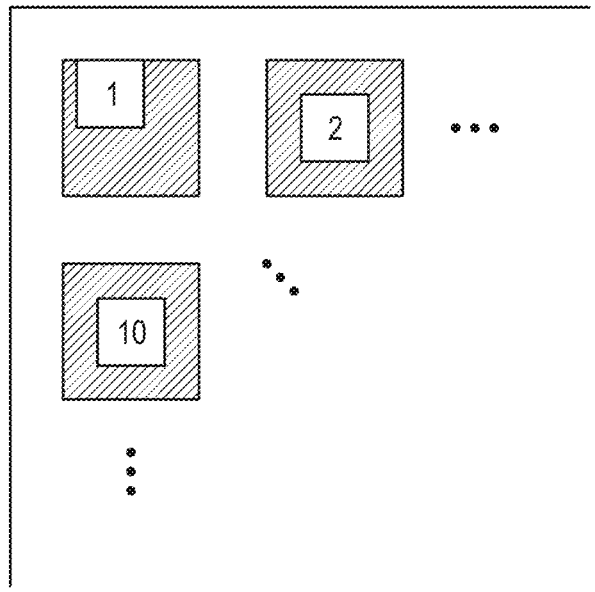
Figure 8D:
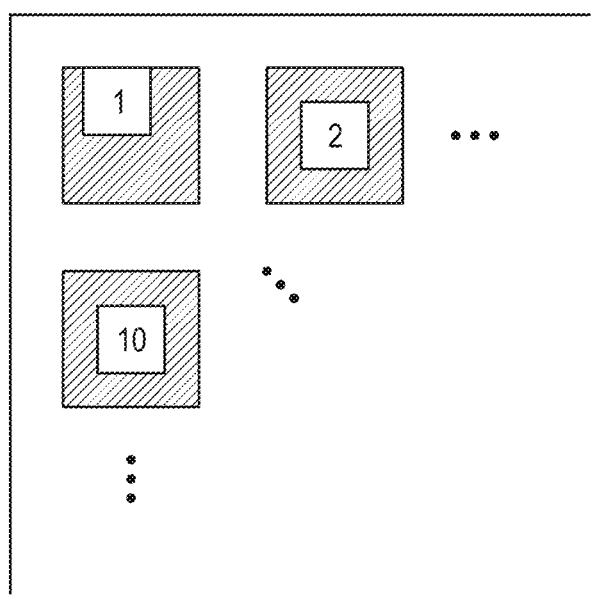
Figure 8E:
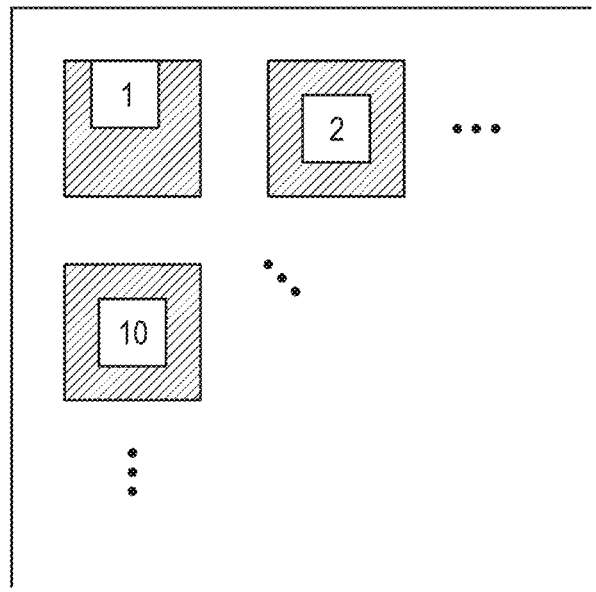
Figure 8F:
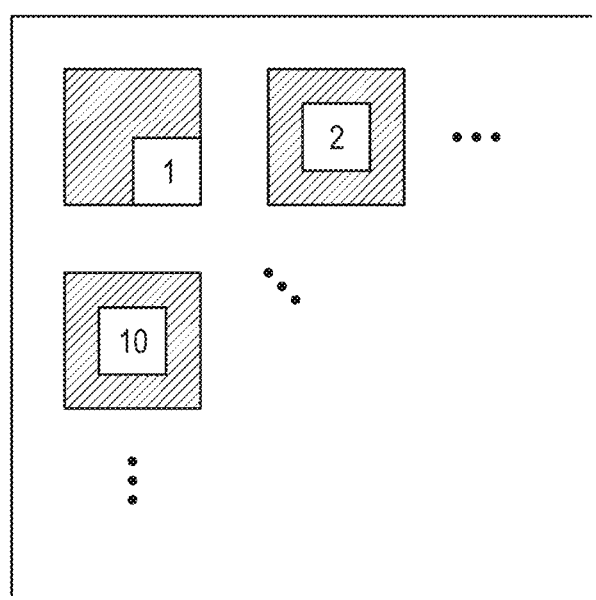

With the absolute pixel differences for pixel block A1 at the (−8, −8) location accumulated and stored, reference pixel block 1 is shifted by one pixel within search area 706 as shown in FIG. 8B (corresponding to the (−8, −7) pixel block position in its associated search area 706) and the above steps are performed again. The calculated absolute pixel differences for reference pixel block 1 at position (−8, −7) are accumulated and stored at position (1, 2) in the difference accumulator array. Shifting of the reference pixel block within search area 706 is performed again as shown progressively in FIGS. 8C, 8D and 8E and so forth until all combinations of pixels within search area 706 have been processed as described above. Reference pixel block 1 having been shifted all the way to its final position (+8, +8) within search area 706 is shown in FIG. 8F. As will be appreciated, at this pixel block position, the calculated absolute pixel differences are accumulated and stored at position (17, 17) in the difference accumulator array. In this embodiment, because there are seventeen (17) searchable positions both horizontally and vertically, there are 17×17=289 pixel block positions to process.

Figure 9A:
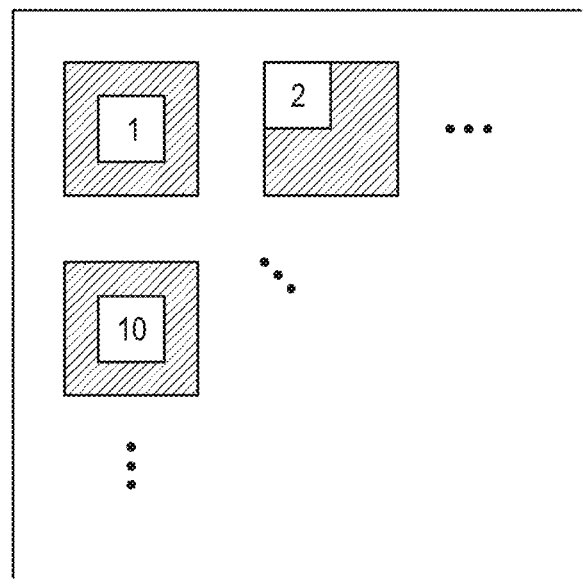
FIGS. 9A-9F are diagrams of a portion of the consecutive video frame of FIG. 7 with a second pixel block from the first video frame being progressively positioned within its respective search area during frame matching.

Once the pixel comparisons for reference pixel block 1 have been completed, a similar process for reference pixel block 2 is performed. During this process, reference pixel block 2 is initially placed at the top left corner of its associated search area 706 (corresponding to the (−8, −8) position in its associated search area 706), as shown in FIG. 9A. The pixels of reference pixel block 2 are then compared with the corresponding pixels in the search area 706 and absolute pixel differences are calculated. The calculated absolute pixel differences for reference pixel block 2 are then accumulated and added to the absolute pixel difference value stored at position (1, 1) in the difference accumulator array.

Figure 9B:
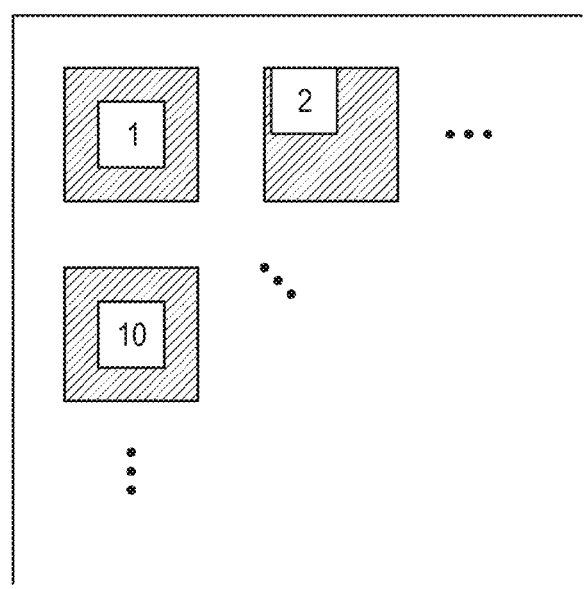
Figure 9C:
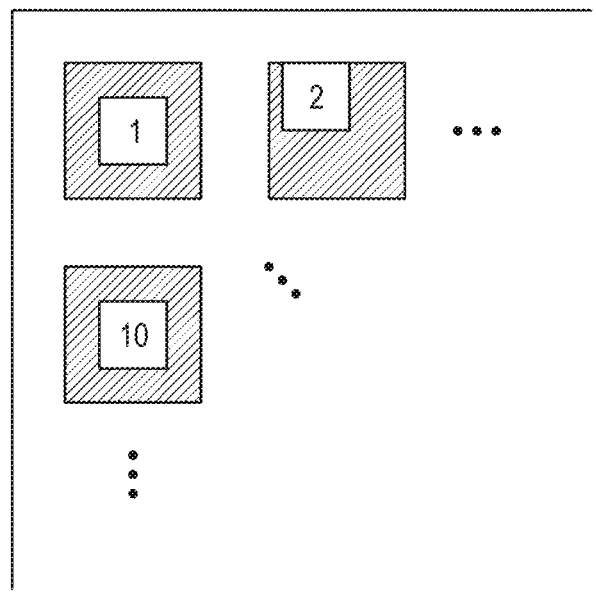
Figure 9D:
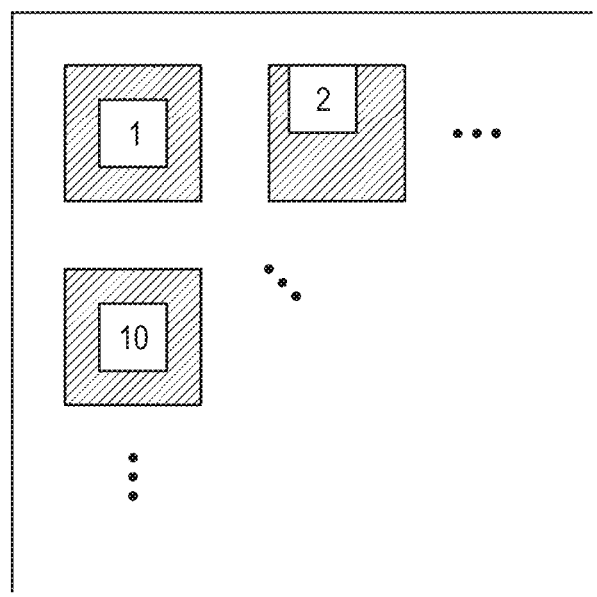
Figure 9E:
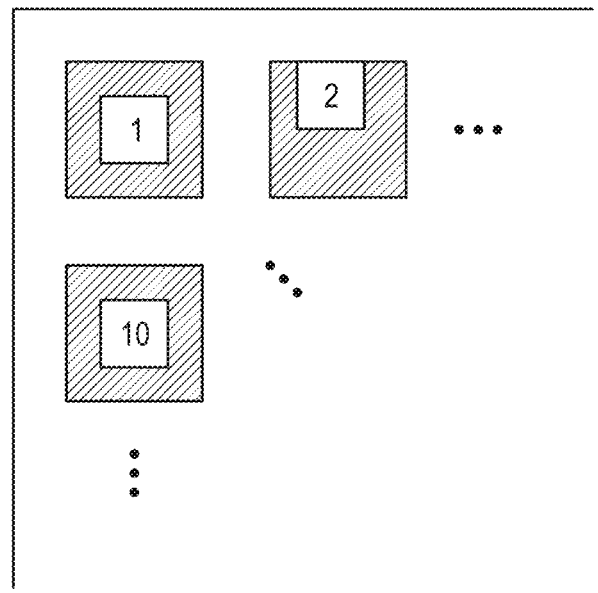
Figure 9F:
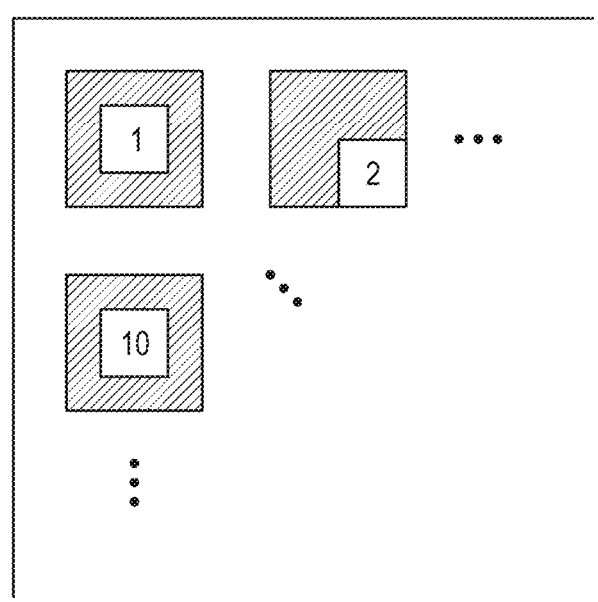
Figure 10A:
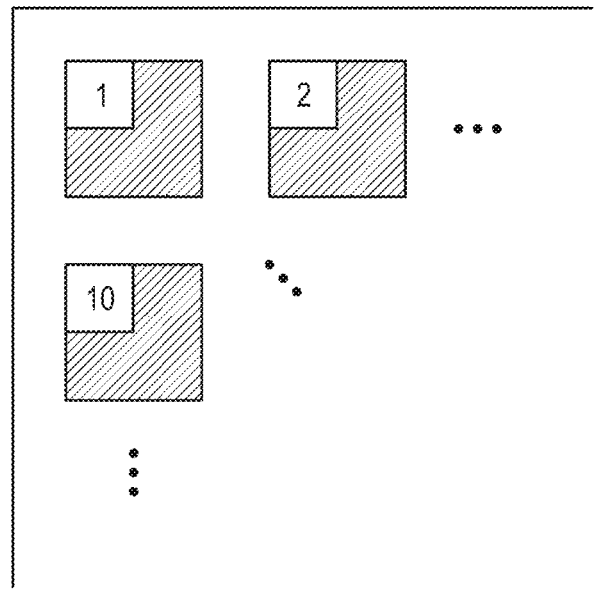
FIGS. 10A-10H are diagrams of a portion of the consecutive video frame of FIG. 7 illustrating positions of the pixel blocks from the first video frame in their respective search areas where the pixel blocks have at least one side coincident with a border of their respective search areas.
Figure 10B:
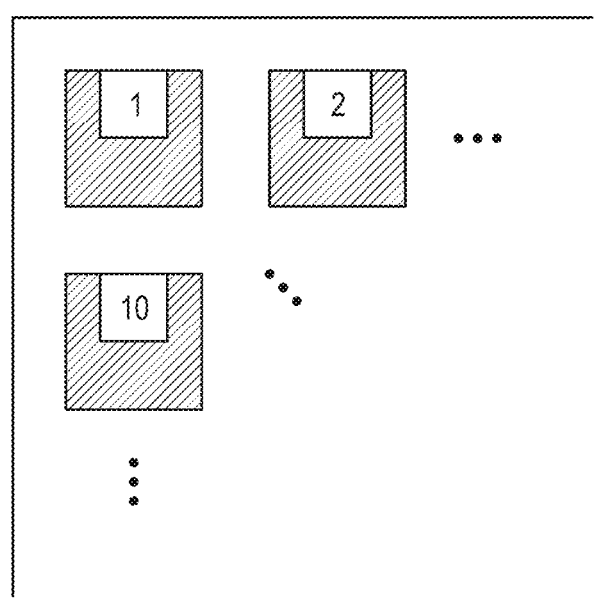
Figure 10C:
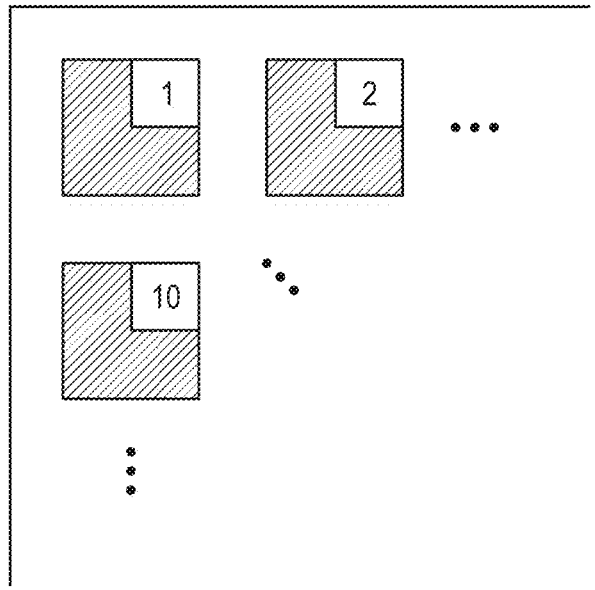
Figure 10D:
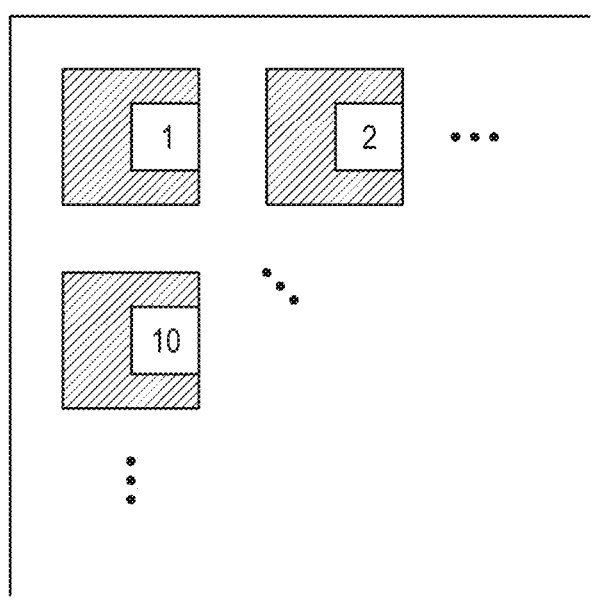
Figure 10E:
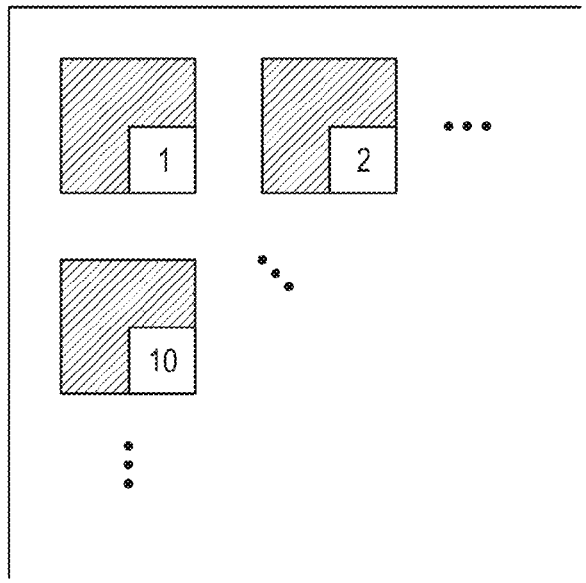
Figure 10F:
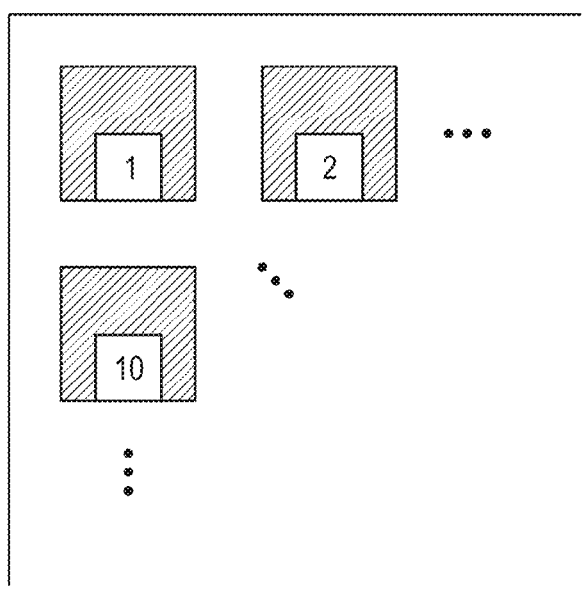
Figure 10G:
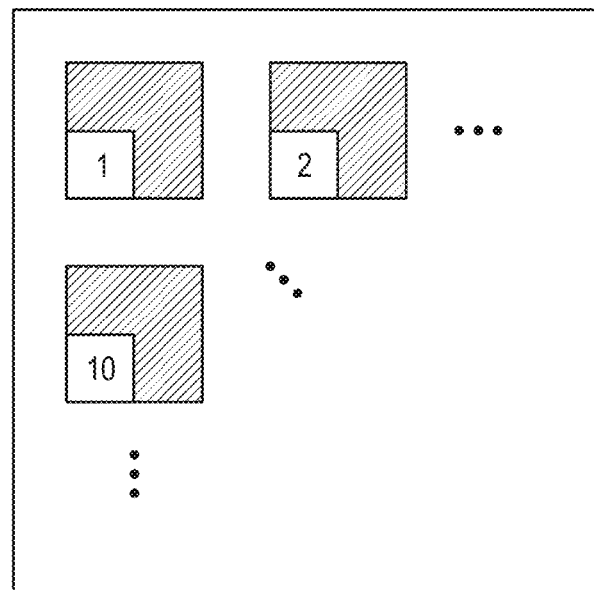
Figure 10H:
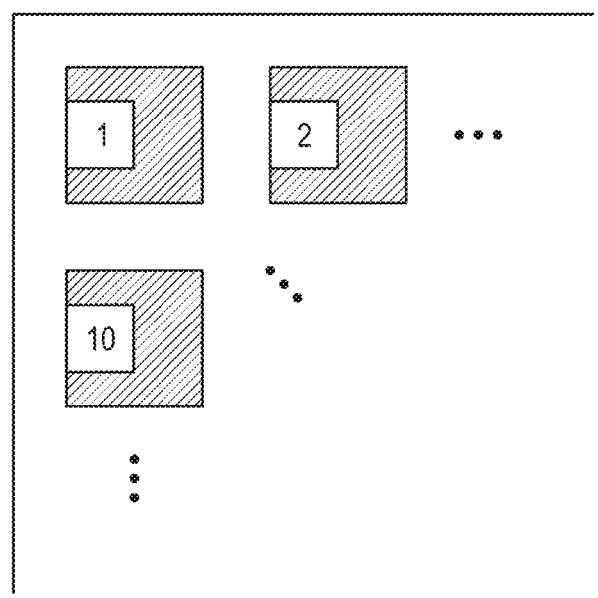

With the absolute pixel differences for reference pixel block 2 at the (−8, −8) location calculated and added to the difference accumulator array, reference pixel block 2 is shifted by one pixel within its associated search area 706 as shown in FIG. 9B (corresponding to the (−8, −7) pixel block position in the search area 706) and the above steps are performed again. The calculated absolute pixel differences for reference pixel block 2 at position (−8, −7) are accumulated and then added to the absolute pixel difference value stored at position (1, 2) in the difference accumulator array. Shifting of reference pixel block 2 within search area 706 is performed again as shown progressively in FIGS. 9C, 9D and 9E and so forth until all combinations of pixels within search area 706 have been processed as described above. Reference pixel block 2 having been shifted all the way to its final position (+8, +8) within search area 706 is shown in FIG. 9F. At this pixel block position, the calculated absolute pixel differences are accumulated and added to the absolute pixel difference values stored at position (17, 17) in the difference accumulator array.

Once the pixel comparisons for reference pixel block 2 have been completed, a similar process for reference pixel block 3 is performed. The above process continues until pixel comparisons for the remaining reference pixel blocks 4 to 81 have been completed. As a result of the above procedure, the difference accumulator array is populated. Thus, each global absolute pixel difference stored in the difference accumulator array represents an error associated with each position in the search area. Each position in the search area corresponds to a candidate global inter-frame motion vector. Therefore, once the difference accumulator array has been populated, a preliminary global inter-frame motion vector is determined by the position in the difference accumulator array having the lowest global absolute pixel difference.

While matching every pixel during frame matching would provide the most accurate result, practical considerations such as performance and computational cost place limitations on the possible number of pixel comparisons that can be made during frame matching. As will be appreciated, the size of the search areas has an impact on the speed and quality of the frame matching. For example, with a surrounding N pixel band, $(2N+1)^2$ absolute pixel differences must be calculated in order to find the best match. Should the surrounding pixel band be doubled to 2N, the total number of absolute pixel differences that must be calculated quadruples in number. Speed of computation is therefore greatly affected. To further reduce a number of frame matching calculations the number of reference pixel blocks may be reduced by matching pixels blocks in only a portion of the frames. A factor q between zero and one may be used to select a sampled frame area whose dimensions are q times the original width and height. The sample frame area may be a central area of the frame or may be centered on a region of the frame in which a highest level of detail is detected, thereby increasing a likelihood that foreground pixels will be used to perform block matching.

Following stage 504, the location of the preliminary matching set of pixel blocks relative to search areas 706 is determined from the position in the global accumulator array having the lowest global absolute pixel difference. For example, if the lowest global absolute pixel difference is at position (1, 1) in the global accumulator array, then the pixel blocks in the preliminary matching set correspond to those at position (−8, −8) in their respective search areas 706. It is then determined whether the pixel blocks in the preliminary matching set have at least one side coincident with a border of their respective search areas (stage 508). FIGS. 10A to 10H are diagrams of a portion of the consecutive video frame of FIG. 7 illustrating various positions of pixel blocks 1, 2 and 10 in their respective search areas 706 where the pixel blocks have at least one side coincident with a border of their respective search areas 706.

Figure 11:
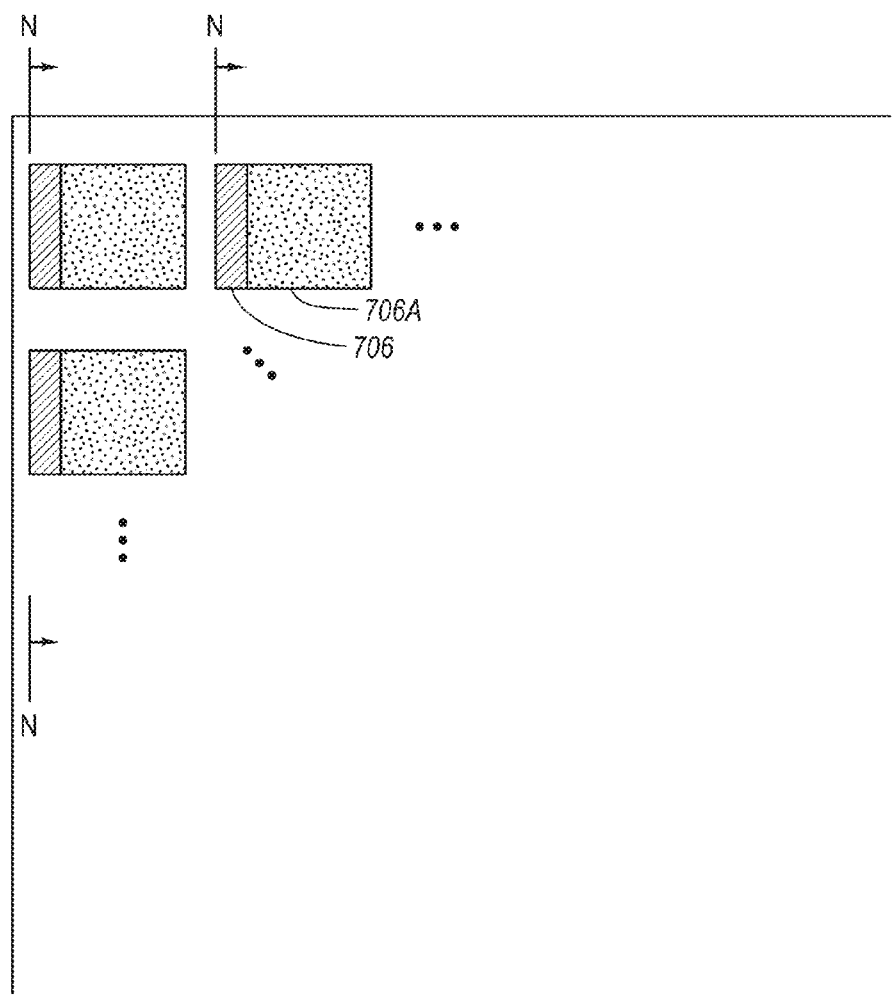
FIG. 11 is a diagram of a portion of the consecutive video frame of FIG. 7 showing shifting of the search areas by a selected amount.

It will be appreciated that if the position of the pixel blocks in the preliminary matching set is within the range (−7, −7) to (+7, +7) in their respective search areas 706, then the pixel blocks in the preliminary matching set of pixel blocks will not have a side coincident with a border of their respective search areas 706. If the pixel blocks in the preliminary matching set do not have a side coincident with a border of their respective search areas, the preliminary matching set of pixel blocks is deemed to be the actual matching set of pixel blocks (stage 510). Otherwise, if the pixel blocks in the preliminary matching set have at least one side coincident with a border of their respective search areas, the search areas are shifted by N pixels in a direction of the coincident border (stage 512). FIG. 11 shows the shifting of the search areas. In this case, the search areas 706 are shifted by N pixels to the right resulting in shifted search areas 706A.

Once the search areas have been shifted, pixel block comparisons similar to those described above with reference to stage 504 are then conducted (stage 512). In this case, the reference pixel blocks in the first video frame are compared with corresponding pixel blocks within associated shifted search areas 706A in the consecutive video frame in order to determine the actual matching set of pixel blocks.

Once the actual matching set of pixel blocks has been designated either at stage 508 or at stage 512, a check is performed to determine whether the designated actual matching set of pixel blocks is a reliable match (stage 514). In order to determine whether the designated actual matching set of pixel blocks is a reliable match, the global absolute pixel difference stored at the position of the actual matching set of pixel blocks in the difference accumulator array is compared to a maximum tolerable error threshold, equal to 15 in one embodiment. If the pixel difference or matching error is less than the error threshold the actual matching set of pixel blocks is deemed to be reliable. Otherwise, an additional reliability check may be performed using an average of the absolute pixel differences in the difference accumulator array. The minimum value in the difference accumulator array (i.e., the value at the position corresponding to the actual matching set) is divided by the average absolute pixel difference according to the following formula:

$$R = \text{Minimum Absolute Pixel Difference/Average of Absolute Pixel Differences}$$

If the error ratio R is greater than or equal to an error ratio threshold value, equal to 0.08 in one embodiment, the designated actual matching set of pixel blocks is deemed to be reliable. Otherwise, the designated actual matching set of pixel blocks is deemed to be unreliable and global inter-frame motion is considered to be zero (stage 516)

If the designated actual matching set of pixel blocks is deemed to be reliable at stage 514, a two-dimensional global inter-frame motion vector is determined based on the position in the difference accumulator array having the lowest absolute pixel difference (stage 518). For example, if the lowest absolute pixel difference is stored at position (1, 1) in the difference accumulator array, then the pixel blocks in the actual matching set correspond to those at position (−8, −8) in their respective search areas 706. The two-dimensional global inter-frame motion vector is therefore (−8, −8).

If search areas 706 have been shifted at stage 510, N is added to the global inter-frame motion vector in the shift direction.

The general principle of pixel comparisons described above involves comparing luminance differences between a pixel subset of one video frame and a plurality of matching candidate sets of pixel blocks in the consecutive video frame. The candidate set of pixel blocks in the consecutive video frame that differs the least from the pixel subset in the first video frame is considered to be its match, and it is on this basis that global inter-frame motion is estimated. Monochrome frame matching reliability is increased by comparing overall absolute pixel differences between the video frames. Because overall absolute pixel differences are employed, multiple block motion vectors are not required for aggregation. Rather, consistent with human perception of motion between the video frames, global inter-frame motion is calculated based on the motion of the majority of the pixels between consecutive video frames. Also, by using a search area that is shifted only under certain conditions, frame matching calculations are at most doubled.

Figure 12:
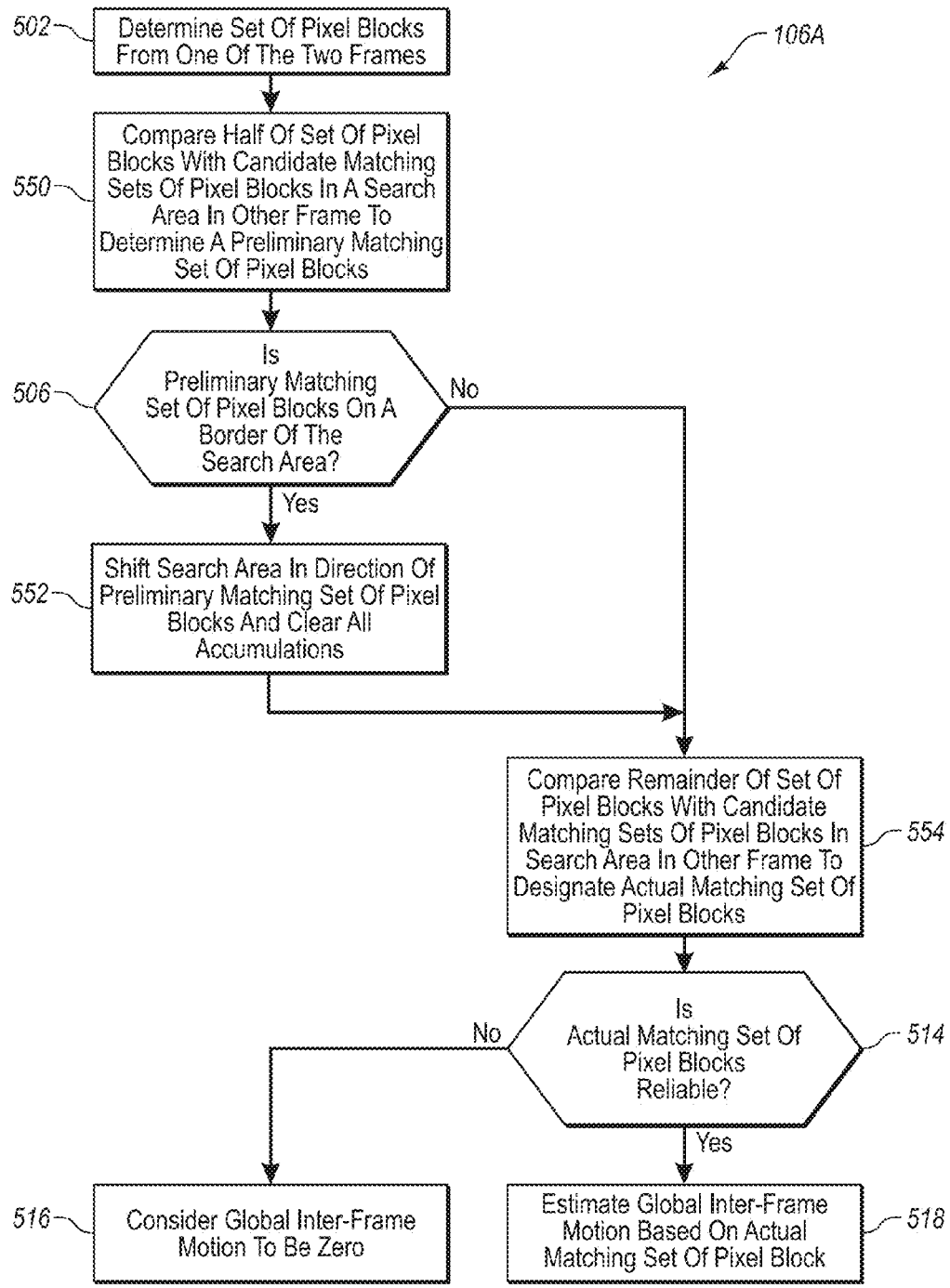
FIG. 12 is a flowchart showing alternative steps for performing frame matching to obtain global inter-frame motion.
Figure 13A:
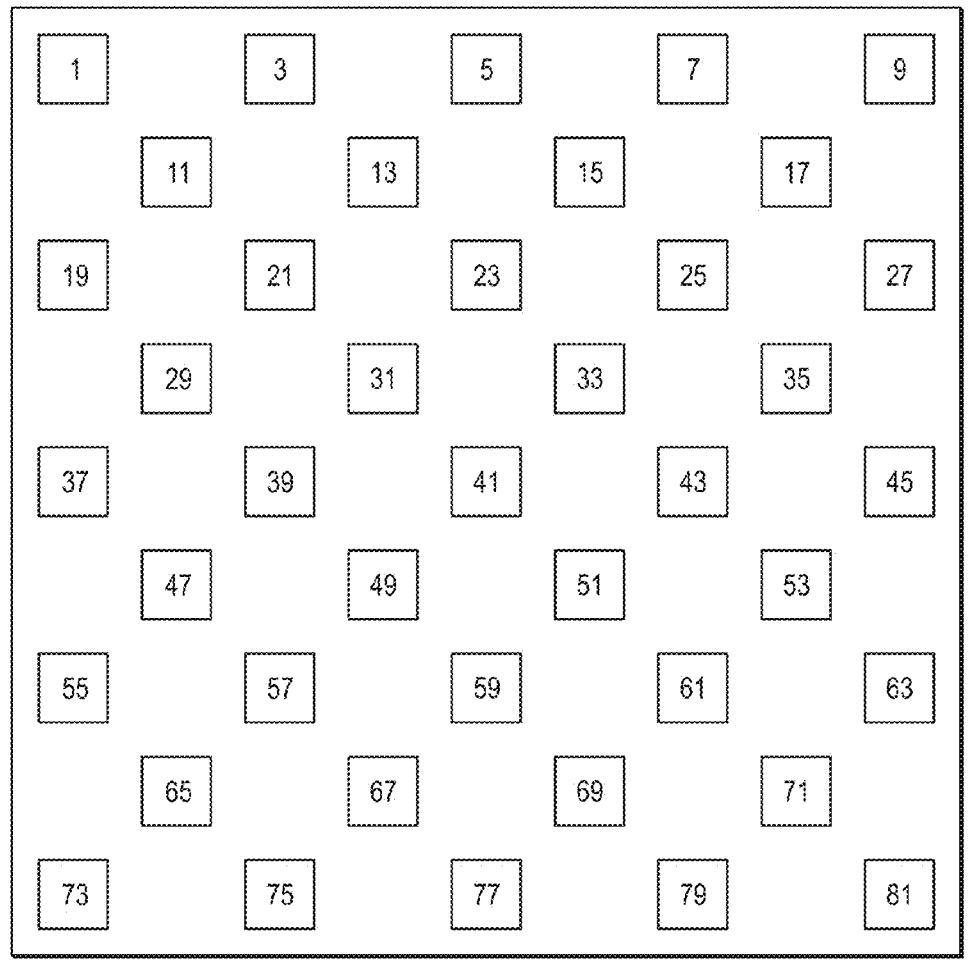
FIGS. 13A and 13B are diagrams of the first video frame of FIG. 6 divided into a plurality of pixel blocks, the plurality of pixel blocks divided into two halves for initial comparing according to the alternative steps in FIG. 12.

FIG. 12 is a flowchart showing alternative steps 106A for performing pixel block comparisons to estimate global inter-frame motion. According to this embodiment, following stage 502 search areas for a first half of the reference pixel blocks in the first video frame as shown in FIG. 13A are defined in the consecutive video frame (i.e., for odd numbered reference pixel blocks 1, 3, 5, 7, 9, etc.). The first half of the reference pixel blocks in the first video frame is then compared to corresponding pixel blocks in the consecutive video frame within respective search areas 706 to populate the difference accumulator array and determine a preliminary matching set of pixel blocks (stage 550).

Following stage 550, it is then determined whether the pixel blocks in the preliminary matching set have at least one side coincident with a border of their respective search areas (stage 506).

Figure 13B:
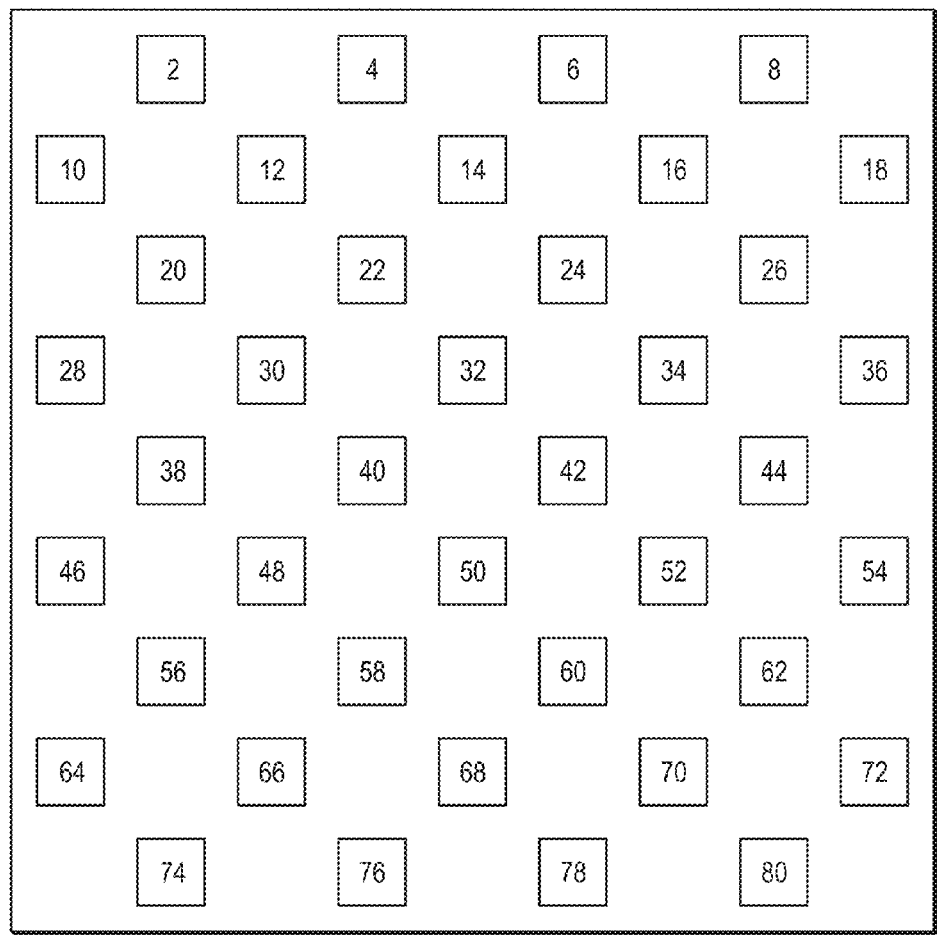

If the pixel blocks in the preliminary matching set of pixel blocks do not have at least one side coincident with a border of their respective search areas, the actual matching set of pixel blocks is expected to be within respective ones of the existing search areas 706, and the other half of the reference pixel blocks (i.e., even number reference pixel blocks 2, 4, 6, 8, etc.) is compared to their corresponding pixel blocks in respective ones of the search areas 706 (stage 554). The other half of the pixel blocks is shown in FIG. 13B.

The absolute pixel differences for the other half of the reference pixel blocks at each position within their respective search areas 706 are accumulated with the values stored at corresponding difference accumulator array positions. The preliminary matching set of pixel blocks is then designated as the actual matching set of pixel blocks.

Otherwise, if the pixel blocks of the preliminary matching set have at least one side coincident with a border of their respective search areas, the search areas are shifted in a direction of the coincident border by N pixels and the accumulations for the preliminary matching set of pixel blocks are discarded along with all of the other calculated absolute pixel differences (stage 552). That is, all positions in the difference accumulator array are set to zero. The evenly numbered reference pixel blocks shown in FIG. 13B are then compared to corresponding pixel blocks within respective shifted search areas in order to calculate absolute pixel differences and determine the actual matching set of pixel blocks (stage 554).

It will be noted that if a shift of the search areas is conducted as described above, the total number of pixel blocks being compared and total number of absolute pixel differences calculated to yield the actual matching set of pixel blocks is about half that of the previously-described embodiment. This is because once the shifted search areas are determined, accumulations are only processed for the other half of the reference pixel blocks.

If the search area has been shifted at stage 552 by N pixels, N is added in the shift direction to the global inter-frame motion vector and each of the regional inter-frame motion vectors.

It will be understood that the pixel block comparisons may be performed in a different order. For example, in the embodiment described above, comparisons for reference pixel block 1 at each position within its respective search area are firstly calculated and the accumulations in the corresponding position of the difference accumulator array stored, prior to calculating comparisons for reference pixel block 2 at each position within its respective search area, and so forth. However, if desired a single comparison for reference pixel block 1 at a particular position within its respective search area can be conducted, then a single comparison for reference pixel block 2 at that particular position, then a single comparison for reference pixel block 3 at that particular position, and so forth until a single comparison for reference pixel block 81 has been conducted at that particular position. Once all comparisons for reference pixel blocks 1 to 81 at the particular position have been processed, the positions of the reference pixel blocks are changed within their respective search areas and comparisons for reference pixel blocks 1 to 81 are conducted at the changed positions. This continues until the reference pixel blocks have been panned across the entire search areas.

Figure 14:
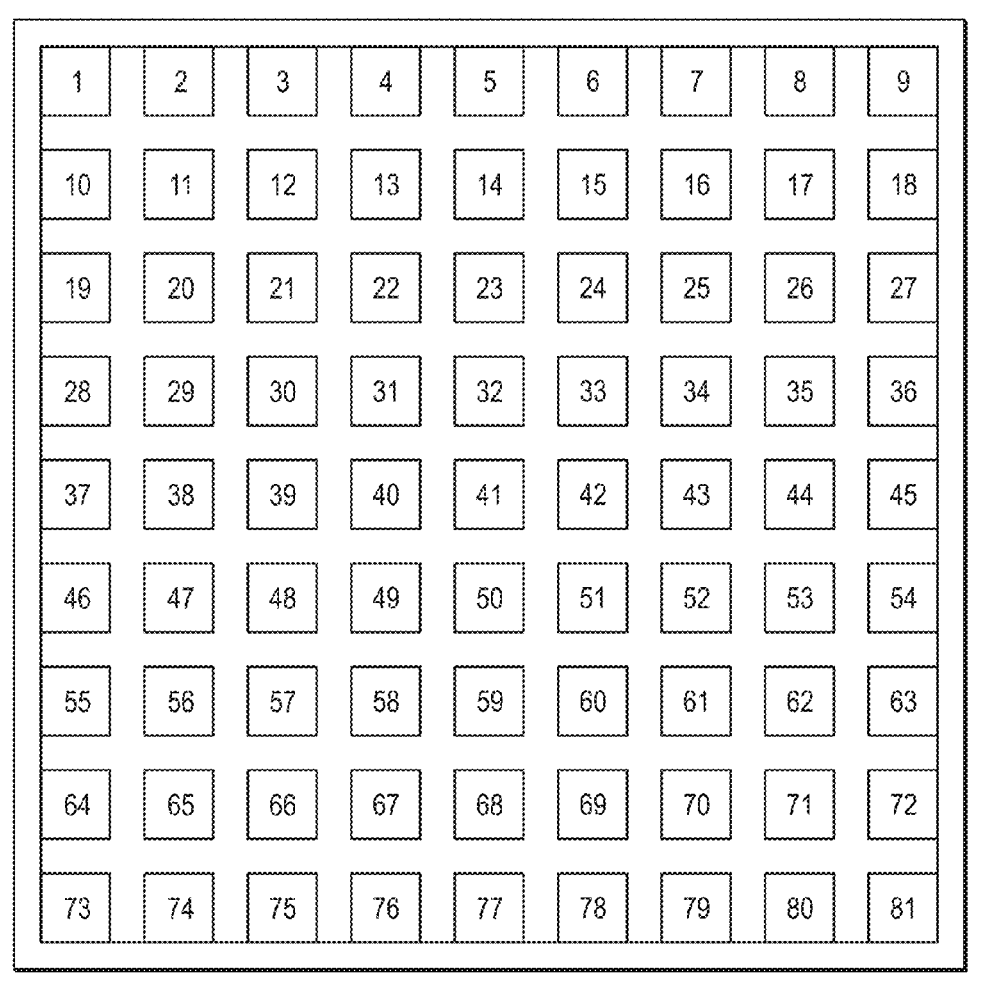
Figure 15:
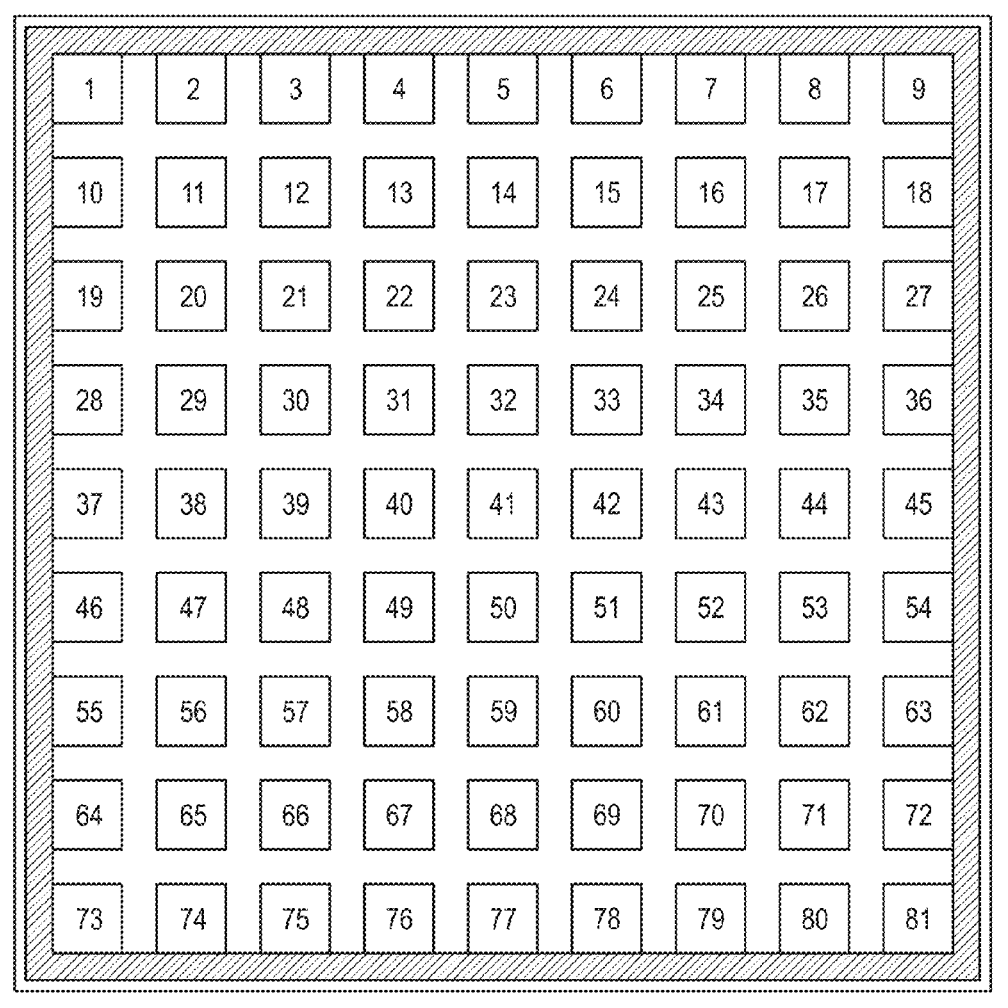

FIG. 14 shows a first video frame similar to that shown in FIG. 6, with a window 708 surrounding the set of reference pixel blocks. As shown in FIG. 15, a search area 710 is defined in the consecutive video frame including the pixels corresponding to those in overlaying window 708 as well as a surrounding band of N pixels, where N is a small number (e.g., 8). The difference accumulator array is defined as described above.

Figure 16A:
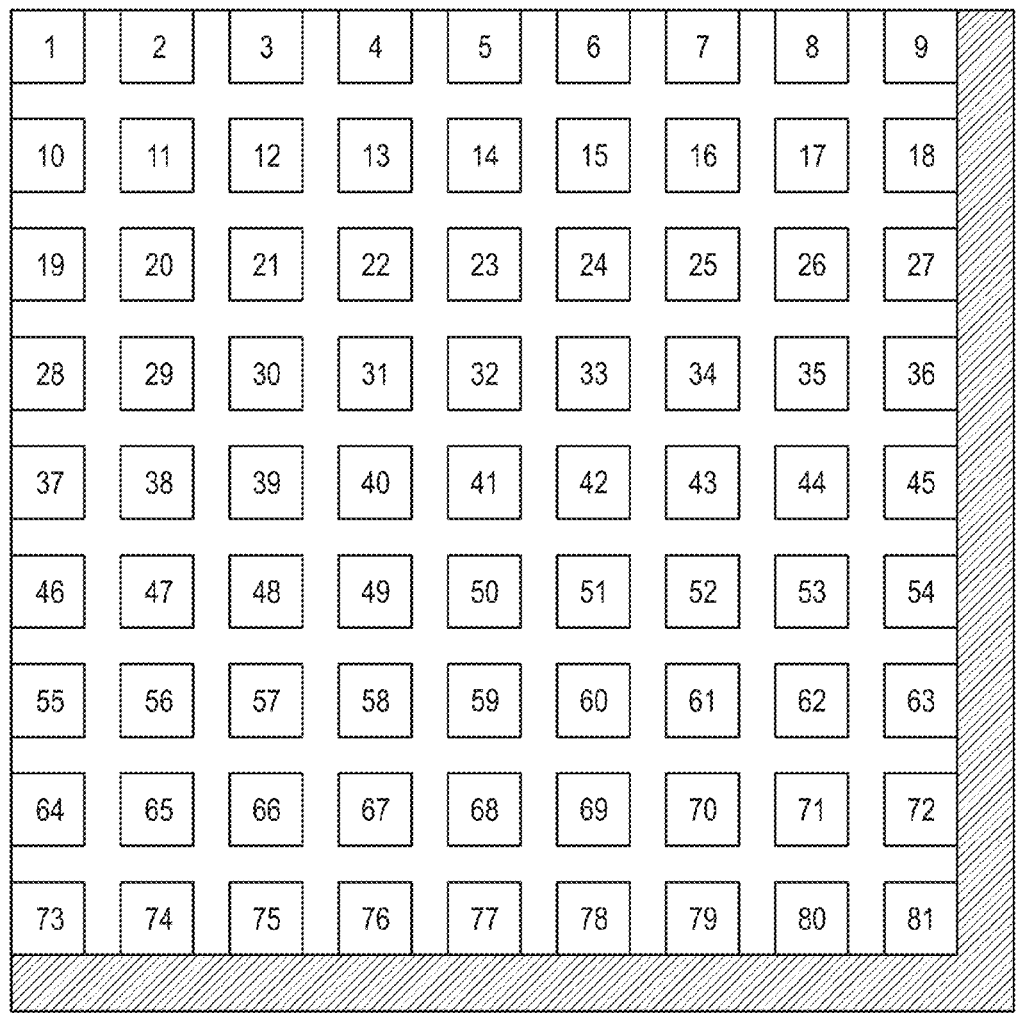

Window 708 defined for the first video frame is then placed at the top left corner of the search area 710 (corresponding to the (−8, −8) position in the search area), as shown in FIG. 16A. The pixels of each pixel block are then compared with the corresponding pixels in the search area 710 and respective absolute pixel differences are calculated. The absolute pixel differences are accumulated and stored in the corresponding position of the difference accumulator array.

Figure 16B:
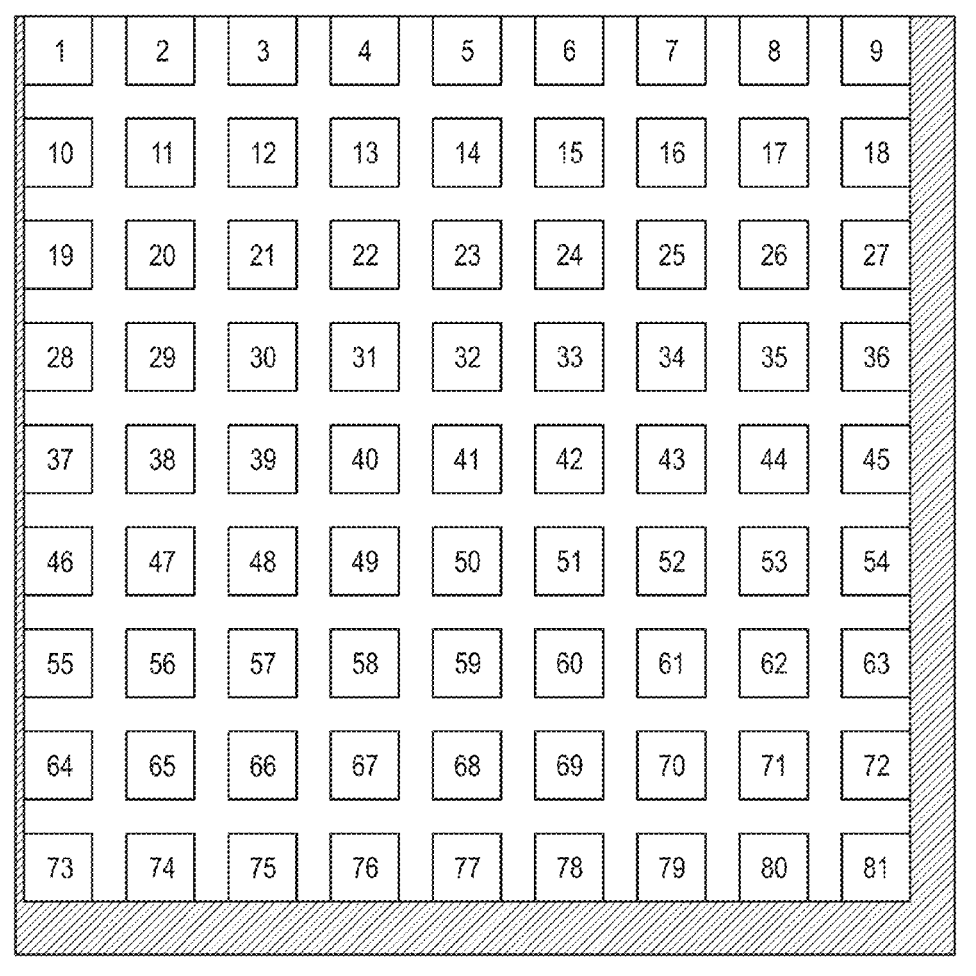
Figure 16C:
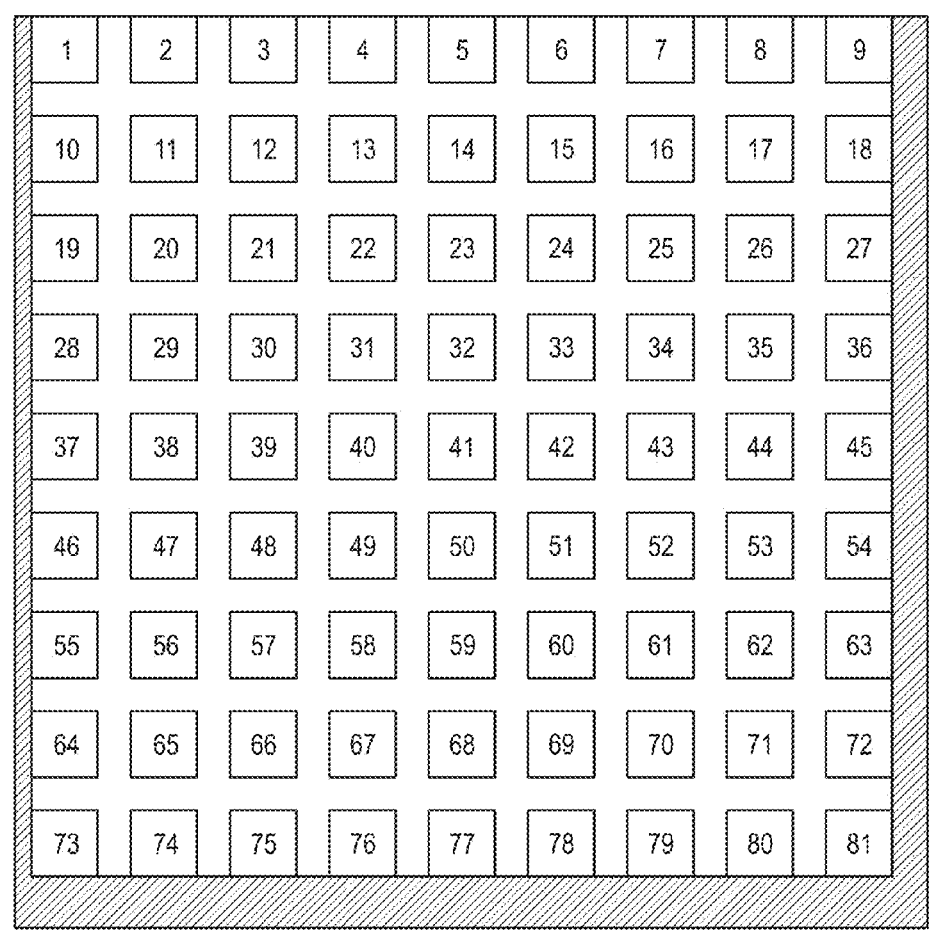

With each of the absolute pixel differences for the set of reference pixel blocks at the (−8, −8) window location determined, window 708 is shifted by one pixel within search area 710 as shown in FIG. 16B (corresponding to the (−8, −7) window position in the search area) and the above steps are performed again. The resulting absolute pixel differences are accumulated and stored in the corresponding position of the difference accumulator array. Shifting of the window within search area 710 is performed again as shown in FIG. 16C and so forth until all combinations of pixels with search area 710 corresponding in size to the window 708 have been processed thereby to populate each entry in the difference accumulator array. Following the above, the global inter-frame motion is determined in the manner described previously.

It will be understood that the threshold values, parameter values, pixel block sizes, panning window values etc. described above are provided as examples. It will also be appreciated by those of skill in the art that these values and sizes may be altered to suit the particular environment in which inter-frame motion estimation and correction is being employed.

For example, while conversion of the video frames to monochrome prior to block matching can reduce processing time and required storage, it will be understood that the methods of frame matching described above can be conducted on video frames that have not been converted to monochrome.

Figure 17:
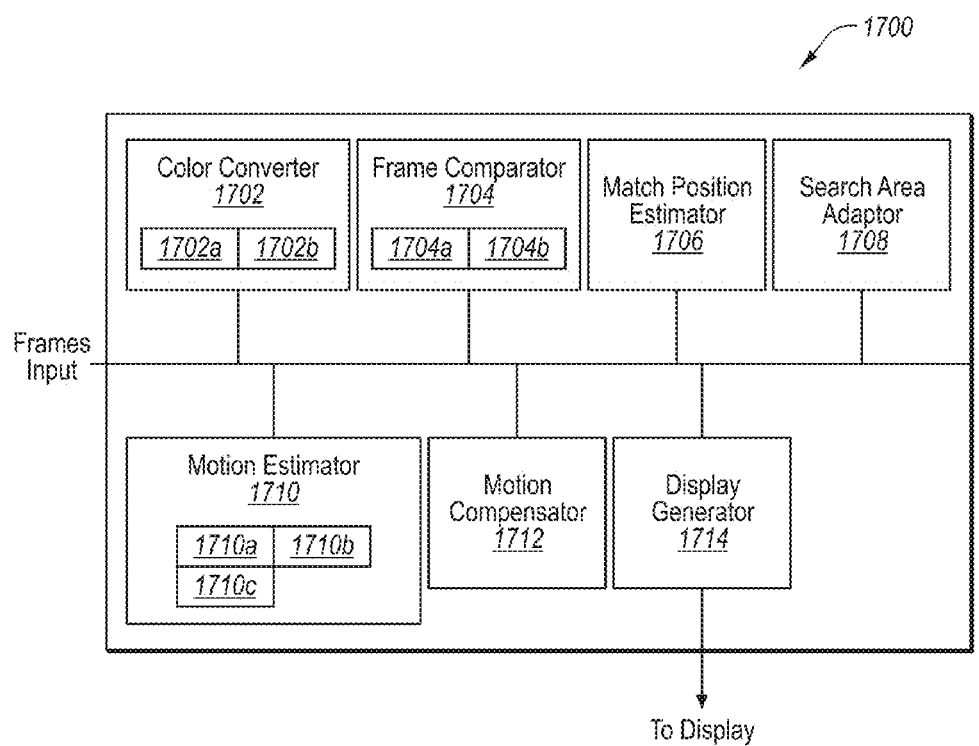
FIG. 17 is a block diagram of an apparatus for estimating and compensating for jitter between video frames in a digital video sequence.

FIG. 17 is a block diagram showing an apparatus 1700 for estimating and compensating for global inter-frame motion in video frames of a digital video sequence in accordance with method 100. Apparatus 1700 may be embodied as a processor, such as processor 206 in video device 200, that is programmed with computer-readable instructions to carry out method 100. In this embodiment, apparatus 1700 comprises a color converter 1702, a frame comparator 1704, a match position estimator 1706, a search area adaptor 1708, a motion estimator 1710, a motion compensator 1712, and a display generator 1714.

Color converter 1702 comprises a bit change frequency calculator 1702a and a bit plane selector 1702b. Frame comparator 1704 comprises a pixel subset definer 1704a and a difference accumulator module 1704b.

The operation of apparatus 1700 will now be described. In operation when a pair of consecutive video frames is to be examined to estimate and correct for inter-frame motion, bit plane selector 1702b of color converter 1702 selects the bit plane for monochrome conversion in response to bit change frequency measures calculated by bit change frequency calculator 1702a. Color converter 1702 then sets each pixel in the first and consecutive video frames to one of black and white based on the selected bit plane. The bit plane selected by this process may also be applied to one or more subsequent frames until the estimated inter-frame motion becomes unreliable, as determined by motion estimator 1710. In addition, or alternatively, a reselection of the bit plane for monochrome conversion may be triggered by a substantial change detected in the sequence of frames, indicating a possible change in image type (e.g., a change from natural images to non-natural images).

Frame comparator 1704 then compares a set of pixel blocks in the first frame to matching candidate sets of pixel blocks within respective search areas in the consecutive frame to determine a preliminary matching candidate set of pixel blocks. Pixel subset definer 1704a defines the difference accumulator array and the set of pixel blocks in the first video frame to be compared with candidate sets of pixel blocks in search areas of the consecutive video frame. Difference accumulator module 1704b accumulates absolute pixel differences in the difference accumulator array as the set of pixel blocks is compared to each of the candidate sets of pixel blocks for each position in the search areas.

Match position estimator 1706 determines the position of the preliminary matching set of pixel blocks relative to the search areas to determine whether to designate the preliminary matching set of pixel blocks as the actual matching set of pixel blocks or to select an alternative matching set of pixel blocks as the actual matching set of pixel blocks based on the position of the preliminary matching set of candidate pixel blocks relative to the search areas. If required, match position estimator 1018 shifts the search areas and conditions the difference accumulator module 1704*b* to calculate absolute pixel differences in the shifted search areas to determine the actual matching set of pixel blocks. Frame comparator 1704, in response to the match position estimator 1706, determines the actual matching set of pixel blocks.

Motion estimator 1710 in turn calculates a global inter-frame motion vector to estimate global inter-frame motion. Motion estimator 1710 determines the reliability of the actual matching set of pixel blocks in the manner described previously. Motion estimator 1710 comprises various components such as a motion reliability module 1710*a*, a calculator 1710*b*, and a threshold comparator 1710*c*.

Motion compensator 1712 transforms the video frames by interpolating the video frame rate and/or enhancing video motion quality in accordance with the estimated motion to correct for or cancel any blur that would otherwise be perceived by the human eye when viewing the frames in rapid sequence. Display generator 1714 may perform additional processing on the video frames in preparation for outputting the frames to a display.

The foregoing example embodiments may be used to estimate global motion in one or more arbitrary separate sections of frames in a video sequence. The methods and techniques may be used in conjunction with methods for improving motion video quality on an LCD panel. In addition to the various alternative embodiments described above, various other versions of method 100 may be implemented including versions in which various acts are modified, omitted, or new acts added or in which the order of the depicted acts differ.

Moreover, although the example embodiments are described in the context of detecting and compensating for global motion they may also be applied to detecting and compensating for local motion. For example, if a region of local inter-frame motion is first identified within a frame, the inter-frame motion within the region may be treated as global inter-frame motion for purposes of the detection and compensation methods described herein.

The example embodiments disclosed herein may be embodied in other specific forms. The example embodiments disclosed herein are to be considered in all respects only as illustrative and not restrictive.

What is claimed is:

1. A method for estimating global inter-frame motion between two video frames in a digital video sequence, comprising:
    comparing luminance data of a reference pixel subset of a first one of the video frames to luminance data of candidate pixel subsets within a search area in a second one of the video frames to determine a preliminary matching pixel subset from the candidate pixel subsets;
    determining an actual matching pixel subset from the other video frame based on a location of the preliminary matching pixel subset relative to said search area;
    calculating a global inter-frame motion vector characterizing global inter-frame motion based on a location of the actual matching pixel subset;
    checking the reliability of the actual matching pixel subset; and
    only calculating the global motion vector if the actual matching pixel subset is deemed to be reliable;
    wherein reliability of the actual matching pixel subset is based on at least one of a sum of absolute difference error calculated for the actual matching pixel subset and a ratio of a minimum to average sum of absolute difference error.

2. The method of claim 1, wherein said determining is based on a location of the preliminary matching pixel subset relative to the boundary of said search area.

3. The method of claim 1, wherein said determining comprises:
    determining if the preliminary matching pixel subset is adjacent a border of the search area;
    if not, designating the preliminary matching pixel subset as the actual matching pixel subset;
    otherwise, altering the search area; and
    comparing the pixel subset to candidate pixel subsets within the altered search area to determine the actual matching pixel subset.

4. The method of claim 3, wherein said altering comprises:
    shifting the search area in a direction of the border to which the preliminary matching pixel subset is adjacent.

5. The method of claim 4, wherein the preliminary matching pixel subset is designated as the actual matching pixel subset if the preliminary matching pixel subset is not adjacent a border of the search area.

6. The method of claim 5, wherein said search area comprises pixels corresponding in location to the pixels of the reference pixel subset in the first video frame together with a band of surrounding pixels.

7. The method of claim 6, wherein the width of the band is equal to the distance the search area is shifted.

8. The method of claim 6, wherein said reference pixel subset comprises a set of pixel blocks, said pixel blocks being distributed substantially uniformly across said first video frame.

9. The method of claim 8, wherein said comparing comprises comparing pixel blocks of the first video frame with corresponding pixel bocks within search areas of the second video frame to determine a preliminary matching set of pixel blocks.

10. The method of claim 9, wherein during the pixel block comparing, absolute differences between luminance values of pixels in the pixel blocks of the first video frame and luminance values of pixels in the corresponding pixel blocks within the search areas of the second video frame are calculated and accumulated to determine the preliminary matching set of pixel blocks.

11. The method of claim 1, further comprising:
    prior to the comparing, converting the video frames to monochrome images.

12. The method of claim 11, wherein the converting comprises:
    converting each pixel in the two video frames to black or white using a selected bit plane of the two video frames, the selected bit plane being selected based on whether a bit change frequency in a sample bit plane of one of the two video frames meets a bit change frequency threshold.

13. The method of claim 1, further comprising:
    processing the video frames to compensate for the estimated global inter-frame motion using the global inter-frame motion vector.

14. An apparatus for estimating global inter-frame motion between two video frames in a digital video sequence, comprising:

a frame comparator configured to compare a reference pixel subset of a first one of the two video frames to candidate pixel subsets within a search area in a second one of the video frames to determine a preliminary matching pixel subset from the candidate pixel subsets;

a match position estimator configured to determine a location of the preliminary matching pixel subset relative to said search area, wherein the frame comparator is further configured to determine an actual matching pixel subset from the second video frame based on a location determined by the match position estimator; and a global inter-frame motion estimator configured to calculate a global inter-frame motion vector based on a location of the actual matching pixel subset;

wherein the global inter-frame motion estimator is further configured to check the reliability of the actual matching pixel subset based on at least one of a sum of absolute difference error calculated for the actual matching pixel subset and a ratio of a minimum to average sum of absolute difference error, only calculates the global motion vector if the actual matching pixel subset is deemed to be reliable.

15. The apparatus of claim 14, further comprising:

a global inter-frame motion compensator configured to process the video frames to compensate for global inter-frame motion based on the global inter-frame motion vector.

* * * * *